United States Patent [19]
Diekelman

[11] Patent Number: 5,574,660
[45] Date of Patent: Nov. 12, 1996

[54] COMMUNICATION METHOD AND APPARATUS

[75] Inventor: Dennis P. Diekelman, Tempe, Ariz.

[73] Assignee: Motorola, Inc., Schaumburg, Ill.

[21] Appl. No.: 89,464

[22] Filed: Jul. 12, 1993

[51] Int. Cl.$^6$ ........................................... G06F 17/00
[52] U.S. Cl. ............................................. 364/514 R
[58] Field of Search .................................. 364/514, 517, 364/735, 514 R; 342/56; 455/13.1, 13.2

[56] References Cited

U.S. PATENT DOCUMENTS

| | | | |
|---|---|---|---|
| 3,836,969 | 9/1974 | Bond et al. | 342/56 |
| 5,184,139 | 2/1993 | Hirako et al. | 342/354 |

OTHER PUBLICATIONS

An advertisement entitled "ARSoftware—The Science and Technical Software Company", from ARSoftware Corporation, Landover, Maryland, dated Dec. 9, 1992.

*Primary Examiner*—Ellis B. Ramirez
*Attorney, Agent, or Firm*—Sherry J. Whitney; Frederick M. Fliegel

[57] ABSTRACT

A method and apparatus for operating a radio for communicating between a terrestrial station and a satellite by (i) selecting one of a number of predetermined computational methods for computing longitudes of particular satellite ground path equator crossings based on minimum and maximum ground path latitudes and terrestrial station coverage perimeter latitudes, (ii) determining a first range of longitudes of satellite ground path equator crossings corresponding to the coverage perimeter, (iii) determining with the selected method, a first time of day when a first equator crossing has a longitude falling within the first range of longitudes, (iv) determining first and second time intervals for satellite ground path position to move from the first equator crossing into and out of the coverage perimeter and (v) activating the radio during a time determined from a combination of the first time of day and the first and second time intervals.

25 Claims, 18 Drawing Sheets

COMMUNICATION METHOD AND APPARATUS

CROSS-REFERENCE TO RELATED APPLICATIONS

This application is related to co-pending U.S. patent application Ser. Nos. 07/909,487, filed on Jul. 6, 1992; 07/795,610, filed on Nov. 21, 1991; and 08/031,586, entitled "COMMUNICATION SYSTEM EMPLOYING SPECTRUM REUSE ON A SPHERICAL SURFACE" and filed on Mar. 15, 1993, which are assigned to the same assignee as the present application.

FIELD OF THE INVENTION

The present invention concerns an improved apparatus and method for transmitting-signals between a satellite constellation and a terrestrial station.

BACKGROUND OF THE INVENTION

A "satellite" is defined herein to mean a man-made object or vehicle intended to orbit a celestial body (e.g., Earth). A "constellation" is defined herein to mean an ensemble of satellites arranged in orbits for providing specified coverage (e.g., radio communication, photogrammetry, etc.) of portion(s) or all of the celestial body. A constellation typically includes multiple rings (or planes) of satellites and may have equal numbers of satellites in each plane, although this is not essential. Calculation of satellite visibility at a particular location on Earth's surface (e.g., at a "terrestrial station") is necessary, for example, to schedule communication between the terrestrial station and one or more of the satellites comprising the constellation. A "visibility time interval" is defined herein to mean that period of time during which a particular satellite is in communication view (e.g., typically line-of-sight) of a particular terrestrial station. References describing satellite communications practices include "Communications Satellite Handbook", by W. L. Morgan and G. D. Gordon (Wiley-Interscience, John Wiley and Sons, 1989) and "Methods of Orbit Determination" by P. R. Escobal (Robert E. Krieger Publishing Co., Malabar, Fla., 1976).

Typically, visibilities of non-geostationary satellites from a terrestrial station having fixed or slowly varying position are calculated by advancing the satellite orbital positions by a fixed time increment and then checking satellite visibility with respect to a particular terrestrial station of interest. This "step-then-check" method is commonly used in the space industry. Once it is determined that a satellite is in view of the particular terrestrial station, further visibility data points may be collected over some time interval while the satellite remains in view. Interpolation methods are then used to determine satellite "rise" (time of first visibility during a visibility time interval) and "set" (time of last visibility during a visibility time interval) times with respect to the particular terrestrial station of interest.

The step-then-check approach is computationally inefficient and thus is poorly suited to determining visibility of constellations having large numbers of satellites intersecting multiple terrestrial stations spread out over the Earth. This is especially true for constellations including satellites in polar or near-polar orbits, because such satellites are infrequently visible to terrestrial stations located near the equator. Thus, it is desirable to rapidly compute all possible satellite visibility time intervals for each terrestrial station. Rapid, computationally efficient methods for satellite visibility determination are needed.

Improved methods and apparatus are needed to rapidly pre-determine when satellite visibility time intervals occur for any given terrestrial station. It is especially important that these provide rapid determination of the visibility of satellites having near-polar orbits from near-equatorial terrestrial stations in a computationally efficient fashion, so that communication can be readily established therebetween.

SUMMARY OF THE INVENTION

A method for operating a radio for communicating between a terrestrial station having a coverage perimeter for satellite communication and a satellite having an orbit and an associated ground path comprises steps of (i) selecting one of a number of predetermined computational methods for computing longitudes of particular satellite ground path equator crossings based on minimum and maximum latitudes of the ground path and latitudes of the coverage perimeter as a selected method, (ii) determining a first range of longitudes of satellite ground path equator crossings corresponding to the coverage perimeter with the selected method, (iii) determining a first time of day when a first equator crossing of the ground path has a longitude falling within the first range of longitudes with the selected method, (iv) determining first and second time intervals for satellite ground path position to move from the first equator crossing into and out of the coverage perimeter with the selected method and (v) activating the radio during a time determined from a combination of the first time of day and the first and second time intervals.

In a system having a control station, one or more terrestrial stations and one or more satellites, a method for rapidly determining constellation visibility is implemented. The control station has a first computer with a first storage medium and is coupled to the terrestrial station. The terrestrial station has a first transmitter and a first receiver each coupled to a first antenna. The satellite has a second computer with a second storage medium, a second transmitter and a second receiver each coupled both to the second computer and to a second antenna. A method for determining constellation visibility from the terrestrial station uses an initial set of data describing terrestrial station constants, satellite parameters and a planning period requested to the first computer, calculates visibility case parameters from the initial data and determines when the satellites comprising the constellation will be visible to the terrestrial stations.

In a preferred embodiment, the present invention provides a method for rapid determination of constellation visibility. The method includes steps of determining a visibility case for a particular satellite of the constellation and a particular terrestrial station by a first computer, calculating visibility time intervals for the visibility case by the first computer and storing the visibility time intervals in a first storage medium of the first computer. Stored visibility time intervals may be used to determine when terrestrial station transmitters and receivers should be turned on or off in order to synchronize communications between the terrestrial station and the satellite.

In an alternate embodiment, the method includes steps of determining a visibility case for a particular satellite of the constellation and a particular terrestrial station by the second computer, calculating visibility time intervals for the visibility case by the second computer and storing the visibility time intervals in the second storage medium of the second computer.

An apparatus for synchronizing communications between a terrestrial station and a satellite comprises a processor and a storage medium. The storage medium is coupled to the processor, stores data received from the processor and supplies stored data to the processor. The apparatus also includes a transceiver for transmitting messages and for receiving messages. The processor, transceiver and storage medium (i) determine a visibility case for the satellite and the terrestrial station, (ii) calculate visibility time intervals for the visibility and (iii) initiate communication between the satellite and the terrestrial station during a visibility time interval determined by the processor.

BRIEF DESCRIPTION OF THE DRAWING

The invention is pointed out with particularity in the appended claims. However, a more complete understanding of the present invention may be derived by referring to the detailed description and claims when considered in connection with the figures, wherein like reference characters refer to similar items throughout the figures and:

Figure 1:
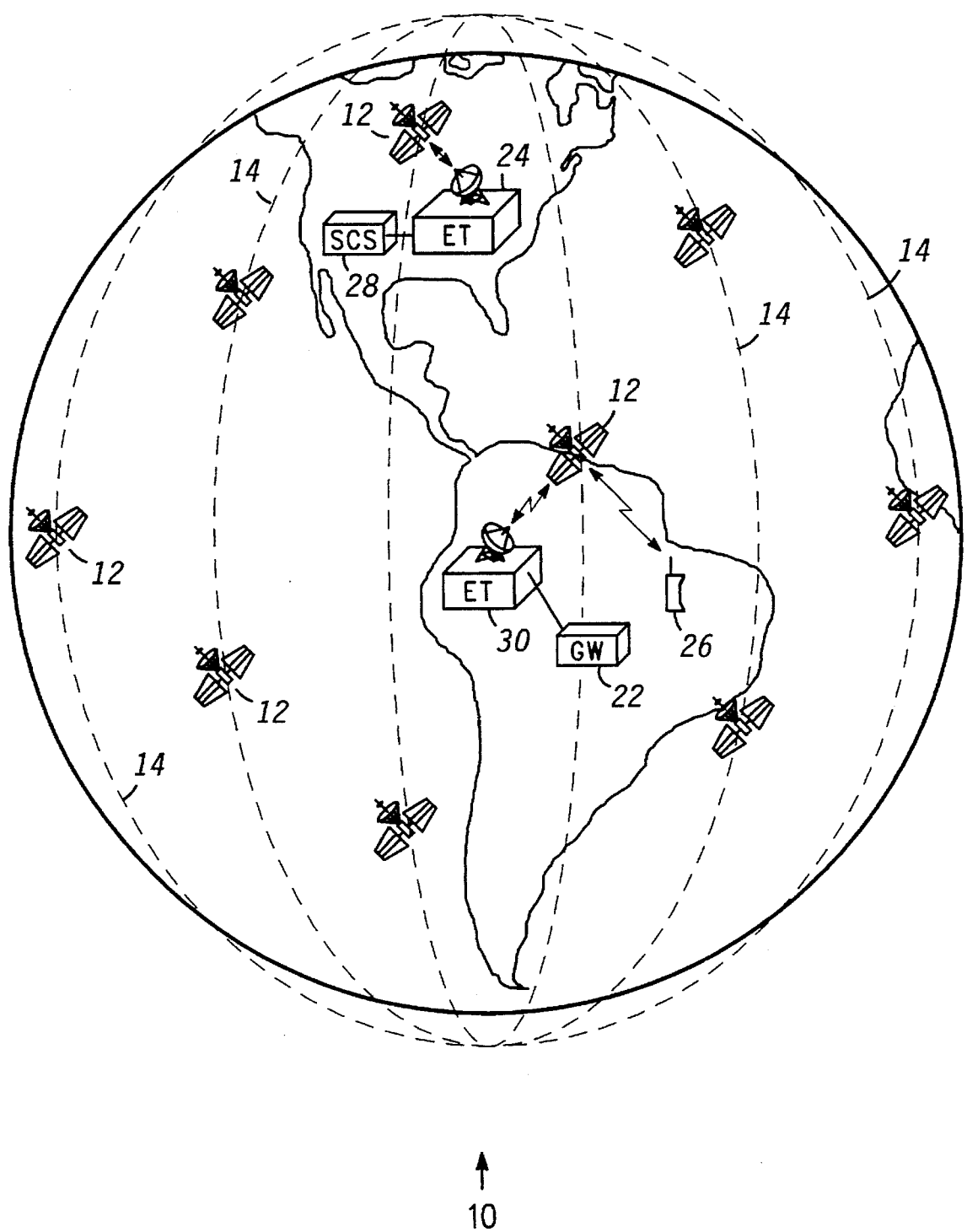
FIG. 1 shows a layout diagram of a satellite-based cellular communication system in accordance with the first embodiment of the present invention.

The exemplification set out herein illustrates a preferred embodiment of the invention in one form thereof and such exemplification is not intended to be construed as limiting in any manner.

DETAILED DESCRIPTION OF THE DRAWING

As used herein, the term "terrestrial" is defined herein to mean on or near the surface of a celestial body such as a planet. A "terrestrial station" is defined herein to mean a communications device on the surface of the Earth whose location (e.g., latitude, longitude and altitude) is known.

FIG. 1 illustrates a highly simplified diagram of satellite-based communication system 10, dispersed over and surrounding a celestial body (e.g., Earth) through use of orbiting satellites 12 occupying orbits 14. The present invention is applicable to systems including satellites having low-Earth, medium-Earth and geosynchronous orbits. Additionally, it is applicable to orbits having any angle of inclination (e.g., polar, equatorial or other orbital pattern). Exemplary communication system 10 uses six polar orbits 14, with each orbit 14 holding eleven satellites 12 for a total of sixty-six satellites 12. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few of satellites 12.

For example, each orbit 14 encircles Earth at an altitude of around 780 km, although higher or lower orbital altitudes may be usefully employed. Due to the relatively low orbits of satellites 12, substantially line-of-sight electromagnetic (e.g., radio, light etc.) transmission from any one satellite or reception of signals by any one satellite involves or covers a relatively small area of Earth at any instant.

For the example shown, satellites 12 travel with respect to Earth at around 19,000 km/hr, allowing satellite 12 to be visible to a terrestrial station for a maximum period of circa nine minutes.

Satellites 12 communicate with terrestrial stations which may include some number of radiocommunication subscriber units (SUs) 26 and earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress).

SUs 26 may be located anywhere on the surface of the Earth or in the atmosphere above the Earth. SUs 26 are preferably communications devices capable of transmitting data to and receiving data from satellites 12. By way of example, SUs 26 may be a hand-held, portable cellular telephones adapted to communicate with satellites 12. Ordinarily, SUs 26 need not perform any control functions for communication system 10.

SCS 28 monitors the health and status of system communication nodes (e.g., GWs 22, ETs 24 and satellites 12) and desirably manages operations of communication system 10.

One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

With the example constellation of sixty-six satellites 12, at least one of satellites 12 is within view of each point on Earth's surface at all times (i.e., full coverage of the Earth's surface is obtained). Theoretically, any satellite 12 may be in direct or indirect data communication with any SU 26 or ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22.

The present invention is also applicable to constellations where full coverage of the Earth is not achieved (i.e., where there are "holes" in the communications coverage provided by the constellation) and constellations where plural coverage of portions of Earth occur (i.e., more than one satellite is in view of a point on the Earth's surface).

Rapid Determination of Constellation visibility

In order to synchronize operations between SUs 26, SCS 28, GWs 22, ETs 24 and satellites 12, it is necessary to predict which of satellites 12 are or soon will be visible to each of ETs 24. It is important to make this determination in a time-efficient and computationally succinct fashion.

The term "coverage perimeter" is defined herein to mean a boundary about a terrestrial station which is generally approximately circular. The area contained by the coverage perimeter is referred to herein as the "coverage area". A "maximum station latitude" is defined herein to mean a latitude tangent to an upper (most northern) edge of a coverage perimeter while a "minimum station latitude" is defined herein to mean a latitude tangent to a lower (most southern) edge of a coverage perimeter.

An "orbit segment" is defined herein to mean a portion of a satellite's orbit. A "satellite ground path" is defined herein to mean the projection of the satellite's orbit onto the celestial body about which the satellite is orbiting. A satellite is "visible" to a terrestrial station when the satellite ground path falls within the coverage perimeter.

Latitudes are taken herein to range from $+\pi/2$ (North pole) to $-\pi/2$ (South pole) radians, however, other choices of units and/or reference points are possible. For purposes of this description, a first latitude is considered greater than a second latitude if the first latitude is closer to the North pole, regardless of whether the magnitude of the first latitude is actually greater than the magnitude of the second latitude.

Figure 2:
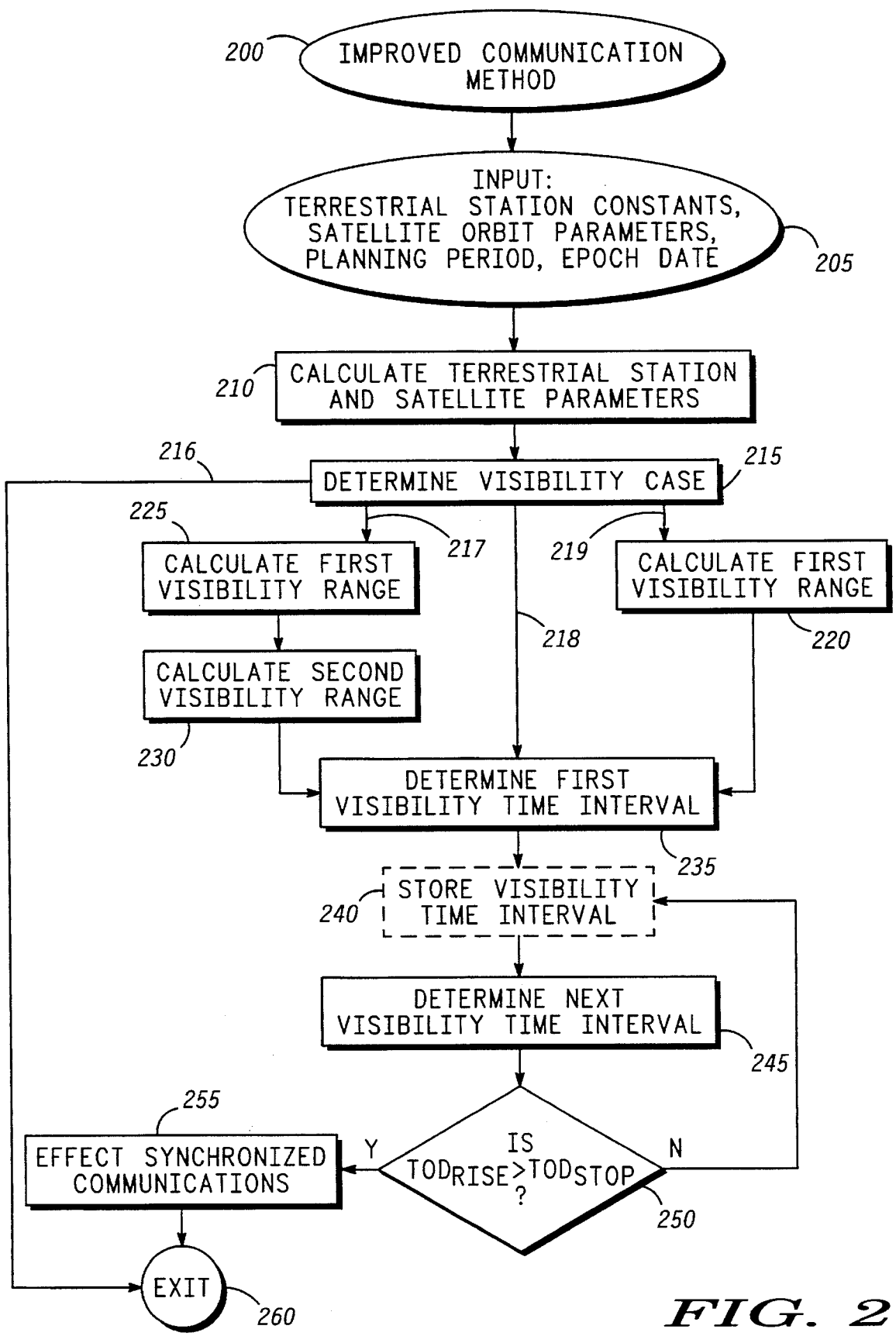
FIG. 2 illustrates a flow chart of a method for determining visibility time intervals in accordance with the present invention to establish communications between terrestrial stations and satellites in accordance with the present invention.

FIG. 2 depicts a flowchart of a method for determining visibility of each of satellites 12 (FIG. 1) to any of ETs 24 (FIG. 1) in a robust and timely fashion. The method begins (block 200) and data describing terrestrial station constants (e.g., latitude, longitude etc.), satellite orbit parameters (e.g., semi-major axis, eccentricity of orbit etc.) and times of interest are initially input (block 205). Typical terrestrial station and satellite parameters, times of interest and symbols herein employed therefor are listed in Tables I, II and III below, respectively. Terrestrial station constants may be determined from maps, by surveying or by using any of various geolocation apparatus, as for example, the global positioning system (GPS). Satellite parameters may be determined from launch data and/or observations by radio, visual, radar or other techniques known to those of skill in the art. Parameters equivalent to those listed in Tables I and/or II may be substituted therefor or calculated from a subset of those listed as desired by the practitioner. Times of interest include an epoch date (absolute date and time of the element set) and a planning period (with associated start epoch and end epoch or duration). "TOD" is defined herein to mean a time of day. Any convenient reference time may be used, as for example, Greenwich Mean Time.

TABLE I

TERRESTRIAL STATION CONSTANTS

Latitude, (geodetic) φ or (geocentric) δ
Earth referenced longitude, θ
Terrestrial station minimum elevation angle, ε

TABLE II

SATELLITE ORBIT PARAMETERS

Semi-major axis, a
Eccentricity, e
Inclination, I
Argument of perigee, ω
Right ascension of the ascending node, AN
Mean anomaly, M

TABLE III

TIMES OF INTEREST

Epoch date, TOD
Planning period, $TOD_{START}$, $TOD_{STOP}$

Terrestrial station and satellite parameters are calculated (block 210) from data such as that contained in Tables I and II. Terrestrial station parameters include, for example, maximum and minimum station latitudes. Satellite parameters include, for example, maximum and minimum satellite latitudes.

A "visibility case" is defined herein to mean a classification of a particular terrestrial station and satellite configuration based on the maximum and minimum station latitudes and the maximum and minimum satellite latitudes. The visibility case determines the maximum number of orbit segments visible from the terrestrial station and the frequency of visibility. For each satellite and terrestrial station, a visibility case is determined (block 215). The present invention classifies a given configuration of terrestrial station(s) and satellite(s) into one of eight visibility cases based on terrestrial station and satellite orbit parameters. The eight possible visibility cases are listed in Table IV and are discussed in more depth in connection with FIGS. 6–8 and associated text, infra.

TABLE IV

VISIBILITY CASES

| Case | Station Latitude Region | Number of possible orbit segments visible | Visibility on which orbits |
|---|---|---|---|
| 1a | equatorial | all | all |
| 1b | N polar | one | all |
| 1c | S polar | one | all |
| 2a | N hemisphere | one | some |
| 2b | S hemisphere | one | some |
| 3a | N hemisphere | two | some |
| 3b | S hemisphere | two | some |
| 4 | N or S hemi | none | none |

When no orbit segments are visible to the terrestrial station, the procedure follows branch 216 and exits (block 260).

The Earth referenced longitude at which a northbound satellite crosses the equator is defined herein to be an "ascension node" which longitude changes for successive orbits due to rotation of both Earth and the satellite orbit plane. When a satellite travels through a "visible ascension node" the satellite intersects the coverage perimeter before the satellite reaches the next ascension node. Therefore, the satellite is visible to the terrestrial station on that orbit.

When at most one orbit segment is visible during some orbits, the procedure follows branch 219 and a first range of visible ascension nodes is calculated (block 220). A method for determination of ranges of visible ascension nodes is discussed later in connection with FIGS. 10–16.

When at most two orbit segments are visible during some orbits, the procedure follows branch 217. First (block 225) and second (block 230) ranges of visible ascension nodes are calculated.

When an orbit segment is visible during every orbit, the procedure follows branch 218. A range of visible ascension nodes need not be determined because a satellite is visible after traveling through any and all ascension nodes.

A "visibility time interval" is defined herein to mean an interval of time during which the satellite is visible to the terrestrial station. The visibility time interval is bounded by the time the satellite enters the coverage perimeter ("rise" time) $TOD_{RISE}$ and the time the satellite exits the coverage perimeter ("set" time) $TOD_{SET}$. Alternatively, $TOD_{RISE}$ and a duration of visibility may define the visibility time interval. The first visibility time interval is determined (block 235) for visibility cases 1a, 1b, 1c, 2a, 2b, 3a and 3b (Table IV). A method for determining the first visibility time interval is discussed later in connection with FIG. 17. The first visibility time interval may then optionally be stored (block 240). A next visibility time interval is then determined (block 245). $TOD_{RISE}$ is then compared to $TOD_{STOP}$ (block 250). When $TOD_{RISE}$ of the next visibility time interval occurs within the requested planning period during which visibility time intervals are to be calculated (e.g., $TOD_{RISE}<TOD_{STOP}$), the next visibility time interval optionally may be stored (block 240). When $TOD_{RISE}$ of the next visibility time interval occurs outside the requested planning period (e.g., $TOD_{RISE}>TOD_{STOP}$), operations dependent on calculated visibility time intervals are carried out (block 255), as, for example, to effect synchronized communications. The procedure then exits (block 260).

In summary, the intervals of time when a satellite is visible to a terrestrial station are calculated according to the present invention. The satellite is visible to the terrestrial station during orbits that intersect the terrestrial station's coverage perimeter. Determination of the satellite orbits that intersect the coverage perimeter is made by first determining the satellite orbits that tangentially intersect the coverage perimeter. Classification of the terrestrial station/satellite configuration into a visibility case is necessary to establish the number of orbit segments potentially visible to the terrestrial station. For visibility cases where one orbit segment is visible, two tangent orbits exist. The two tangent orbits establish a range of visible orbits, within which all orbits will intersect the coverage perimeter. When two orbit segments are visible, four tangent orbits exist. The two tangents on the ascending portion of the orbit establish a first range of visible orbits, and the two tangents on the descending portion of the orbit establish a second range of visible orbits.

After the ranges of visible orbits are determined, the angular distance from the satellite's current position to the first time the satellite's orbit will intersect the coverage perimeter is calculated. The time of coverage perimeter intersection is determined from this distance.

A conventional step-then-check method incrementally calculates location data at every increment in the orbit, whether or not the satellite is visible to the terrestrial station at each point. The method of the instant invention determines a visibility time interval when the satellite will be visible to the terrestrial station and then calculates satellite location data only within the visibility time interval.

For example, calculated visibility time interval data enable the terrestrial station to know when and where to point an antenna toward the satellite in order to be able to establish communications therewith. Transmitters and receivers are turned on in accordance with visibility time intervals in order to synchronize transfer of information between terrestrial stations (e.g., ETs 24, FIG. 1) and satellites (e.g., satellites 12, FIG. 1).

In a preferred embodiment, previously calculated (blocks 235 and 245) and stored (block 240) visibility time intervals are transmitted (block 255) to satellites in order that satellites may communicate satellite status etc., to ET 24 (FIG. 1) during a visibility time interval. Satellites may also receive commands including commands relaying visibility tables (containing stored visibility time intervals) during such visibility time intervals. This is useful if, for example, a single-event upset in a particular satellite has temporarily disabled inter-satellite communications.

Alternatively, the procedures illustrated in FIG. 2 (or a suitable subset or the equivalent thereof) may be carried out in satellites (e.g., satellites 12, FIG. 1). Visibility time intervals may be used to determine when command signals may be received from a terrestrial control station (e.g., SCS 28).

For another example, calculated visibility time intervals may be used for general reconnaissance purposes (e.g., terrestrial observation of hostile or friendly satellites, satellite photogrammetry of a particular area etc.).

Calculate Terrestrial Station and Satellite Parameters

Figure 3:
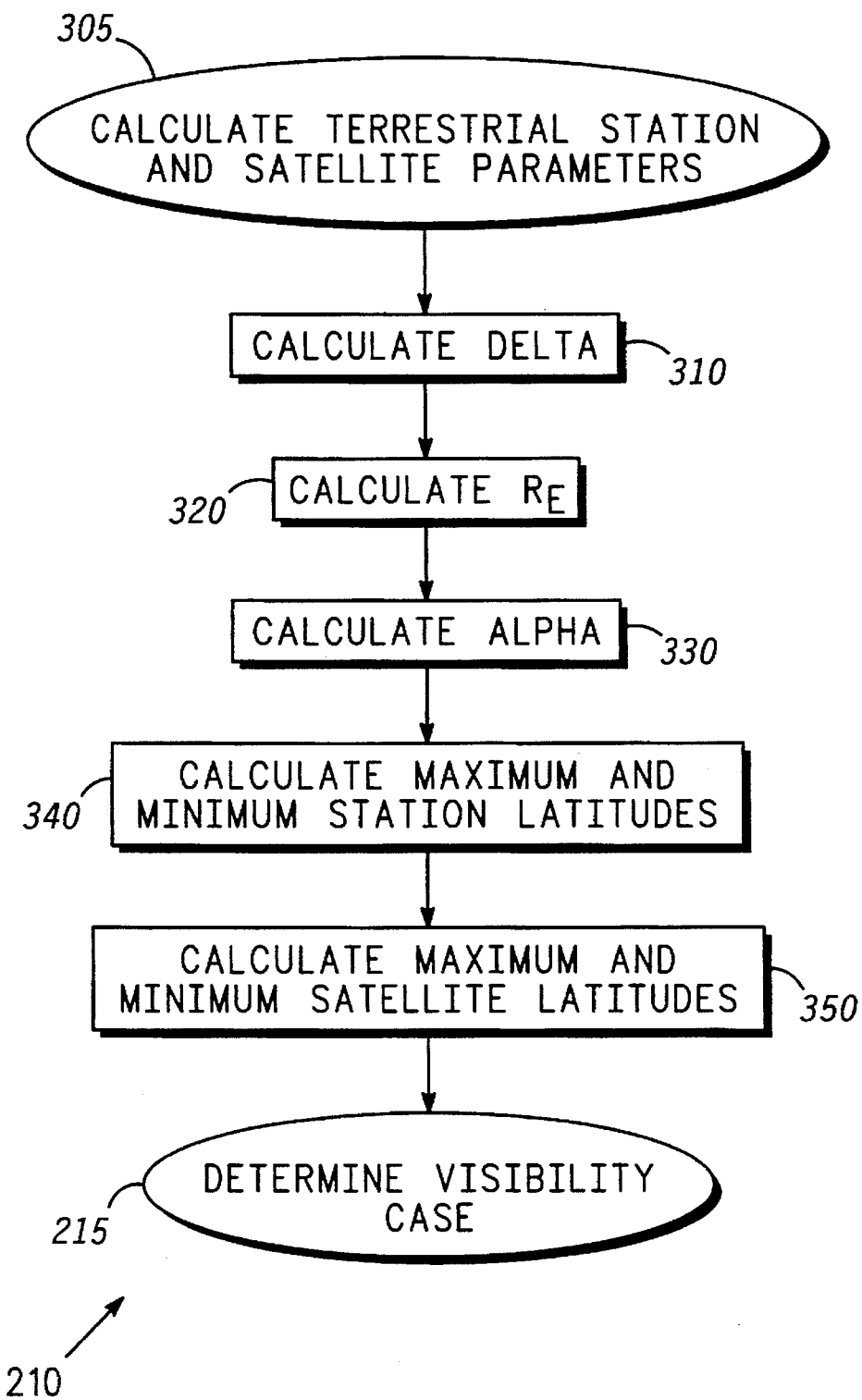
FIG. 3 illustrates a flow chart of a method for calculating terrestrial station and satellite parameters in accordance with the present invention.

FIG. 3 depicts a flowchart of a method for calculating terrestrial station and satellite parameters (block 210). The method begins (block 305) and the geocentric latitude DELTA (referred to herein as $\delta$) of the terrestrial station is calculated (block 310). Then, an estimate $R_{ave}$ of the satellite's average altitude over the station is calculated (block 320). The estimate $R_{ave}$ is preferably made large to avoid missing visibility opportunities. The coverage angle ALPHA is then calculated (block 330). The "coverage angle" is defined herein to mean an angle between the terrestrial station, the center of the celestial body and the coverage perimeter. Maximum and minimum station latitudes are calculated (block 340). Maximum and minimum satellite latitudes are calculated (block 350) and the procedure exits (block 215). A "maximum satellite latitude" is defined herein to mean a latitude tangent to the most northern point that a satellite ground path attains during an orbit. A "minimum satellite latitude" is defined herein to mean a latitude tangent to the most southern point that a satellite ground path attains during an orbit.

Figure 4:
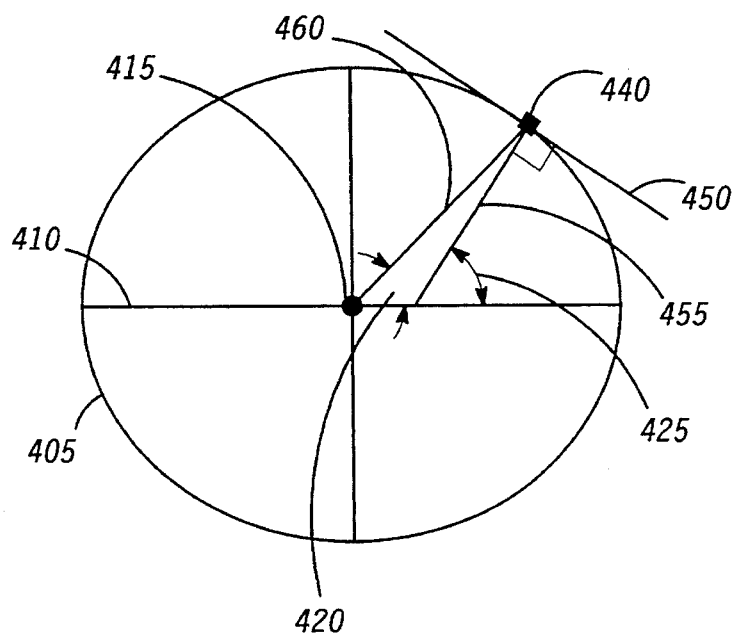
FIG. 4 shows a diagram of the relationship between geocentric and geodetic latitudes in accordance with the present invention.

FIG. 4 shows the relationship between geocentric 420 and geodetic 425 latitudes for an oblate spheroid 405 such as Earth. Oblate spheroid 405 has center 415 and equatorial plane 410. Tangent 450 to the surface at terrestrial station 440 defines line 455 perpendicular to tangent 450 intersecting equatorial plane 410. The angle between line 455 and equatorial plane 410 is geodetic latitude 425 of terrestrial station 440. The angle between equatorial plane 410 and line 460 from terrestrial station 440 to center 415 is geocentric latitude 420 of terrestrial station 440. Most maps define latitudes in geodetic terms which do not account for the oblate shape of the Earth. Correction is desirable in order to provide geocentric latitudes for spherical trigonometric calculations from geodetic latitudes used in most maps, etc. For Earth, geocentric latitude $\delta$ (or DELTA) is approximated (block 310) from geodetic latitude $\phi$ as follows:

$$\delta = \phi - 0.00335794 \cdot \sin(2\phi), \quad (1)$$

where angles $\phi$ and $\delta$ are expressed in radians.

The "terrestrial station latitude" is defined herein to mean the geocentric latitude at which the terrestrial station is located. Eq. 1 allows accurate spherical calculations when input terrestrial station parameters include geodetic latitudes.

Different radii exist at different latitudes. The geocentric radius of oblate spheroid 405 at terrestrial station 440 is represented by the length of line 460. One definition of Earth's radius $R_E$ at a terrestrial station is determined (block 320) as:

$$R_E = \{ (R_{equ}^2 R_{pole}^2)/(R_{equ}^2 \sin^2\delta + R_{pole}^2 \cos^2\delta) \}^{0.5}, \quad (2)$$

where $R_{equ}$ and $R_{pole}$ represent equatorial and polar planetary radii, respectively and $\delta$ represents geocentric terrestrial station latitude 420 in radians.

Figure 5:
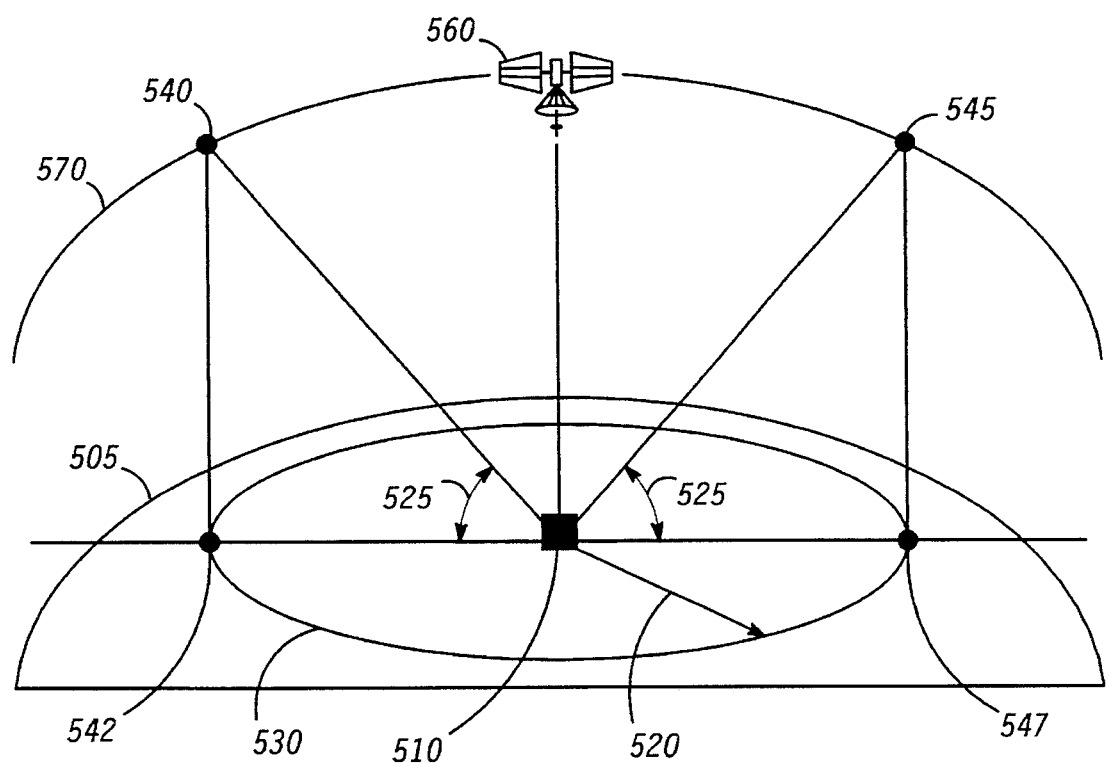
FIG. 5 shows a diagram of a coverage area associated with a terrestrial station in accordance with the present invention.

FIG. 5 shows terrestrial station 510 located on the surface of celestial body 505. Satellite 560, traveling from left to right in orbit path 570, is first visible to terrestrial station 510 at time $TOD_{RISE}$ corresponding to point 540, when satellite 560 attains minimum elevation angle 525. Satellite 560 is last visible to terrestrial station 510 at time $TOD_{SET}$ corresponding to point 545, when satellite 560 travels below minimum elevation angle 525. Projections of orbit path 570 onto the surface of celestial body 505 from points 540 and 545 define points 542 and 547, respectively, on coverage perimeter 530 of terrestrial station 510. Coverage perimeter 530 contains a coverage area. When orbit path 570 projection (i.e., "ground path") intersects the coverage area, satellite 560 is "visible" to terrestrial station 510. Spherical arc 520 subtends an angle $\alpha$ between terrestrial station 510, the center of celestial body 505 and coverage perimeter 530. The angle $\alpha$ is defined herein as the "coverage angle" and is usefully calculated (block 330) as:

$$\alpha = \pi/2 - \epsilon - \sin^{-1}\{ R_E \cos\epsilon / (R_{ave} + R_E) \}, \quad (3)$$

where $\epsilon$ represents minimum elevation angle 525 employed in subsequent calculations and $R_{ave}$ represents the average satellite altitude above the surface of celestial body 505 while the satellite is visible.

Figure 6:
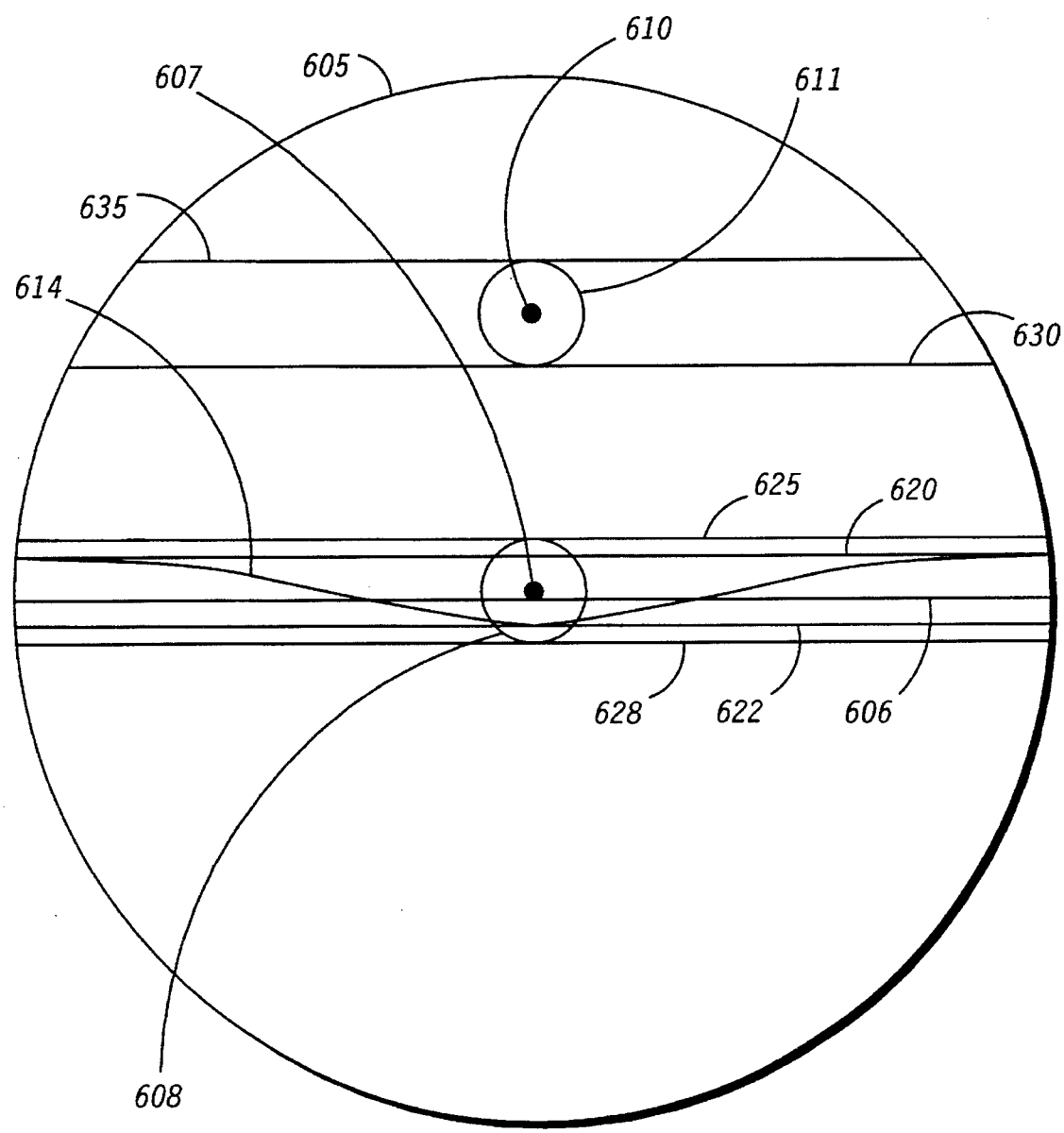
FIGS. 6–8 illustrate different possible visibility cases for satellites orbiting a celestial body in accordance with the present invention.
Figure 7:
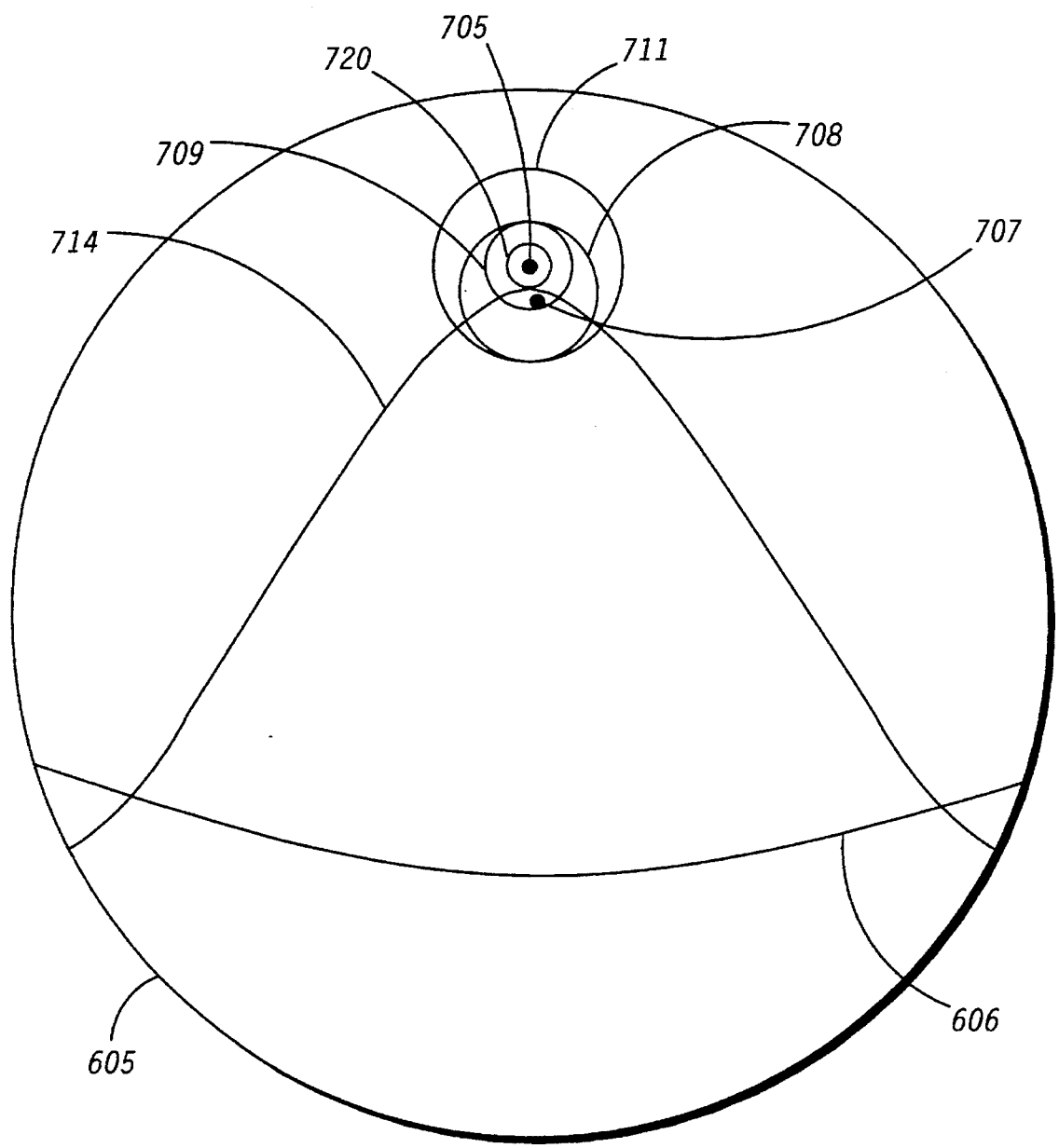
Figure 8:
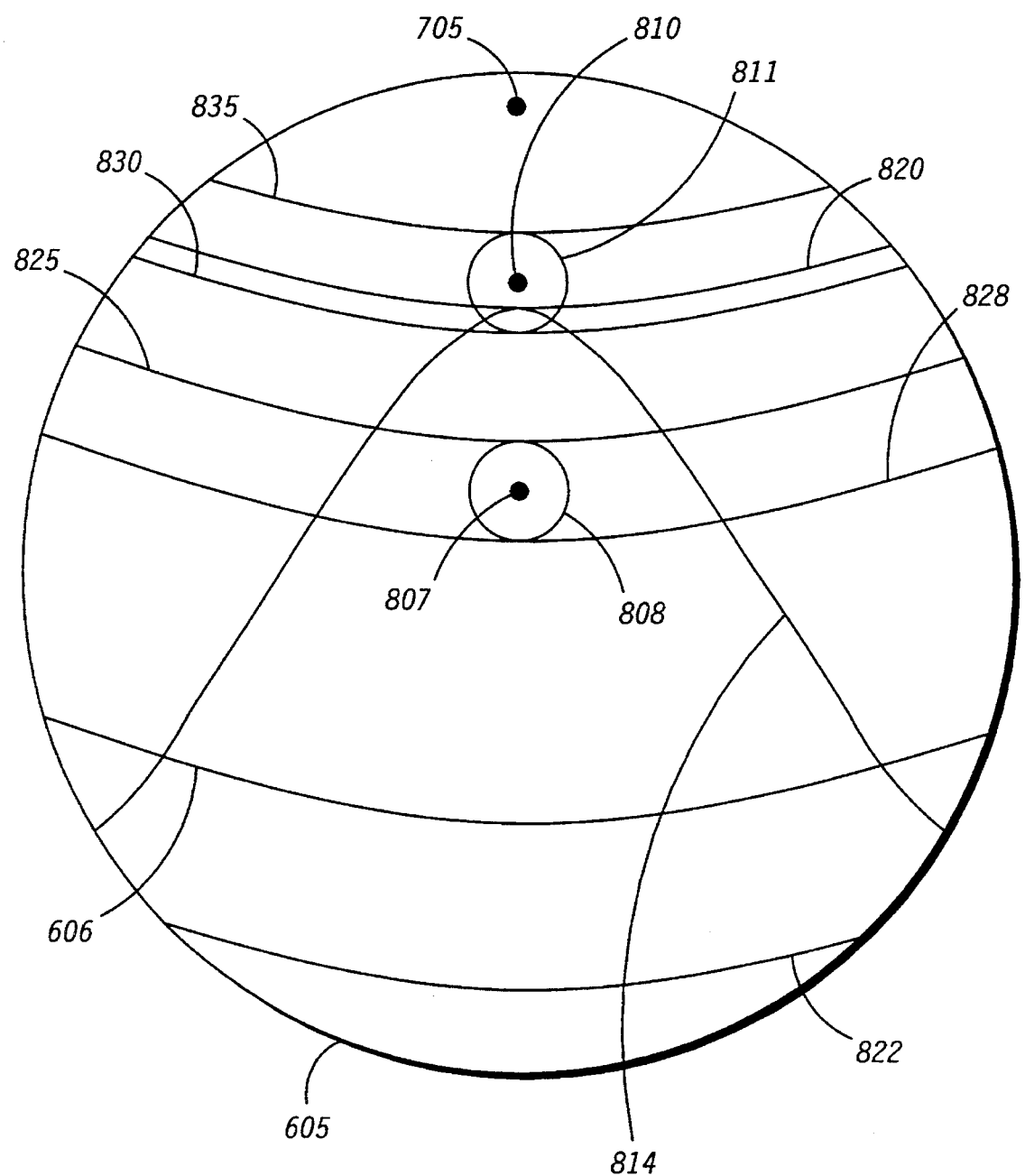

Minimum and maximum station and satellite latitudes are described in FIGS. 6–8 and accompanying text. Minimum and maximum station latitudes are calculated (block 340) as $\delta - \alpha$ and $\delta + \alpha$, respectively, unless terrestrial station latitude $\delta$ is within $\alpha$ radians of a pole or an equator. When terrestrial station latitude $\delta$ is within $\alpha$ radians of a pole or an equator, calculation of minimum and maximum station latitudes should take the sign change of the latitudes into account, as is appreciated by those of skill in the art.

Maximum satellite latitude is calculated (block 350) as I and minimum satellite latitude is calculated as −I, where I represents inclination of orbit (i.e., angular separation of the orbital and equatorial planes).

Terrestrial station and satellite parameters are thus determined. These parameters are necessary for the classification of the terrestrial station and satellite orbit combination into a visibility case.

Determine Visibility Case

FIGS. 6–8 illustrate the different possible visibility cases for satellites (e.g., satellites 12, FIG. 1) orbiting celestial body 605 having equator 606.

FIG. 6 illustrates visibility case 1a (Table IV), showing celestial body 605 (e.g., Earth) having first terrestrial station 607 near equator 606 and having associated coverage perimeter 608. First terrestrial station 607 has maximum station latitude 625 and minimum station latitude 628. Maximum 620 and minimum 622 satellite latitudes are less and more, respectively, than maximum 625 and minimum 628 station latitudes. A satellite (e.g., satellite 12, FIG. 1) traveling in an orbit having associated ground path 614 has all orbit segments eventually visible to terrestrial station 607 because all segments of ground path 614 eventually pass through coverage perimeter 608 as the satellite orbit precesses around celestial body 605.

FIG. 6 also illustrates visibility case 4 (Table IV), showing second terrestrial station 610 having associated coverage perimeter 611. Second terrestrial station 610 has maximum station latitude 635 and minimum station latitude 630. A satellite (e.g., satellite 12, FIG. 1) traveling in an orbit having associated ground path 614 has no orbit segments visible to terrestrial station 610 (i.e., no portion of ground path 614 ever intersects coverage perimeter 611). For visibility case 4, either maximum satellite latitude 620 is less than minimum station latitude 630 (as shown) or minimum satellite latitude 622 is greater than a maximum station latitude (i.e., terrestrial station (s) located in the Southern hemisphere, not illustrated).

FIG. 7 illustrates visibility case 1b (Table IV), showing celestial body 605 having third terrestrial station 707 north of equator 606 and near pole 705 (e.g., the North pole). Third terrestrial station 707 has coverage perimeter 708 and has associated minimum station latitude 711. Maximum satellite latitude 720 exceeds minimum station latitude 711 and maximum station latitude 709. A satellite (e.g., satellite 12, FIG. 1) traveling in an orbit having associated ground path 714 has maximum satellite latitude 720. Because maximum satellite latitude 720 is greater than maximum station latitude 709, satellite 12 has a single orbit segment visible to terrestrial station 707 (i.e., only one portion of ground path 714 ever passes through coverage perimeter 708) during every orbit. The visible orbit segment is that portion of the orbit above minimum station latitude 711.

An analogous scenario (visibility case 1c, Table IV), not illustrated in FIG. 7, occurs when a terrestrial station is antipodally located with respect to third terrestrial station 707 (i.e., in a corresponding position near the South pole). Satellites (e.g., satellite 12, FIG. 1) in orbits having ground path 714 also have one satellite orbit segment visible during every orbit. The visible orbit segment is that portion of the orbit below the maximum station latitude.

FIG. 8 illustrates visibility case 3a (Table IV), showing celestial body 605 having fourth terrestrial station 807 located in the Northern hemisphere (i.e., between equator 606 and pole 705) and having associated coverage perimeter 808. Fourth terrestrial station 807 has maximum station latitude 825 and minimum station latitude 828. Maximum 820 and minimum 822 satellite latitudes are more and less, respectively, than maximum 825 and minimum 828 station latitudes. A satellite (e.g., satellite 12, FIG. 1) traveling in an orbit having associated ground path 814 has at most two orbit segments visible to terrestrial station 807. The two visible orbit segments are separated by that portion of the orbit greater than maximum station latitude 825 and that portion of the orbit less than minimum station latitude 828. During some particular orbits, no orbit segments are visible, while during other particular orbits, one or two orbit segment are visible.

An analogous scenario (visibility case 3b, Table IV), not illustrated in FIG. 8, occurs when a terrestrial station is similarly located, but in the Southern hemisphere. The maximum station latitude (not shown) is less than maximum satellite latitude 820 and the minimum station latitude (not shown) is more than minimum satellite latitude 822. Similar to visibility case 3a, a satellite (e.g., satellite 12, FIG. 1) traveling in an orbit having associated ground path 814 has at most two orbit segments visible to a terrestrial station.

FIG. 8 also illustrates visibility case 2a (Table IV), showing fifth terrestrial station 810 located in the Northern hemisphere and having associated coverage perimeter 811. Fifth terrestrial station 810 has maximum station latitude 835 and minimum station latitude 830. For visibility case 2a, maximum satellite latitude 820 is more than minimum station latitude 830 and less than maximum station latitude 835. A satellite (e.g., satellite 12, FIG. 1) traveling in an orbit having associated ground path 814 has at most one orbit segment visible to terrestrial station 810. The visible orbit segment is that portion of the orbit above minimum station latitude 830.

An analogous scenario (visibility case 2b, Table IV), not illustrated in FIG. 8, occurs when a terrestrial station is similarly located, but in the Southern hemisphere. In visibility case 2b, the minimum station latitude (not shown) is less than the minimum satellite latitude (not shown) and the maximum station latitude (not shown) is more than the minimum satellite latitude (not shown). A satellite (e.g., satellite 12, FIG. 1) traveling in an orbit having associated ground path 814 has at most one orbit segment visible to the terrestrial station. The visible orbit segment is that portion of the orbit below the maximum station latitude.

Figure 9:
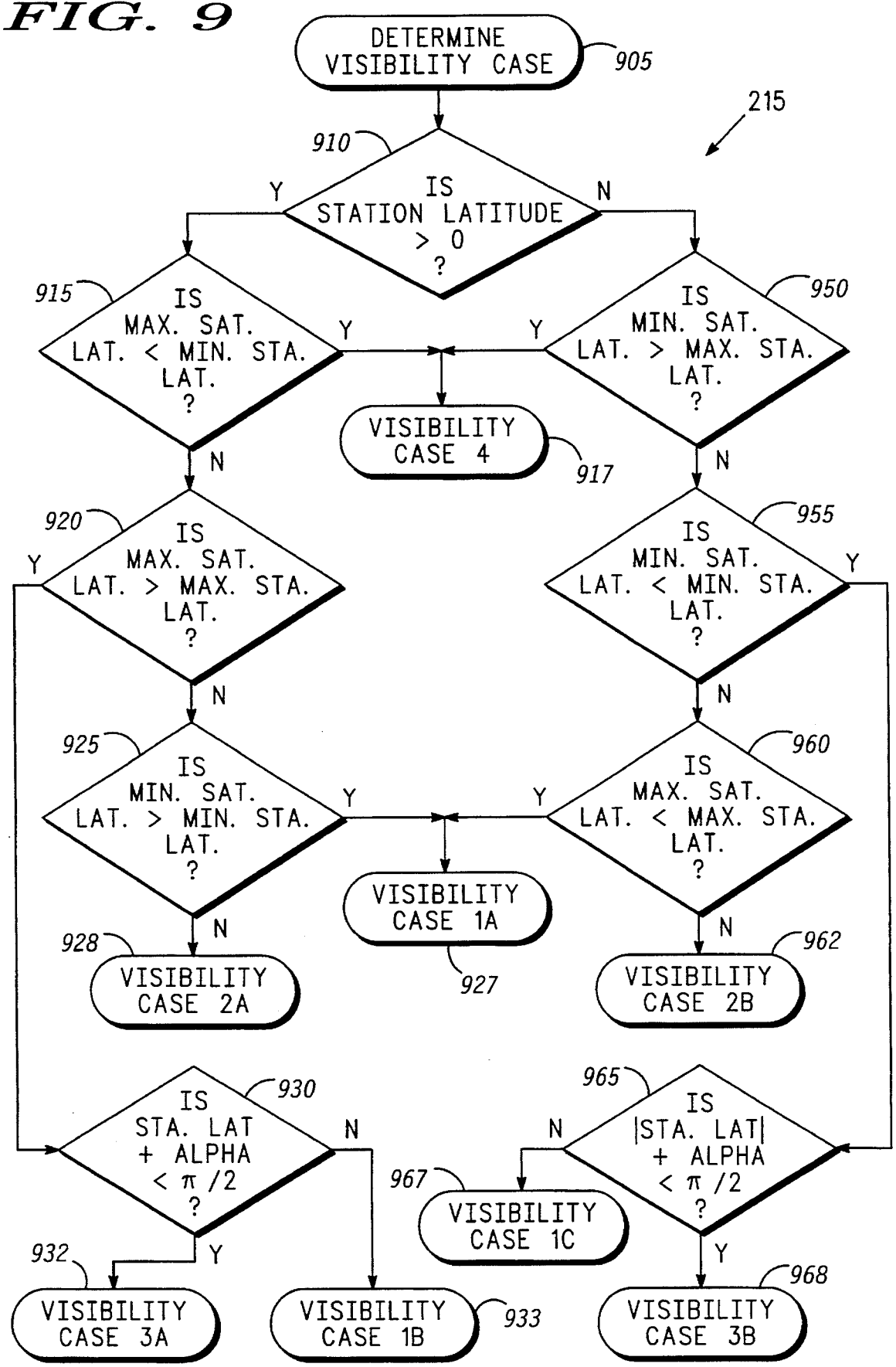
FIG. 9 illustrates a flow chart for a decision tree for determining which satellite visibility case corresponds to a particular terrestrial station and satellite in accordance with the present invention.

FIG. 9 illustrates a flow chart for a decision tree for determining which satellite visibility case pertains to a given satellite and terrestrial station (block 215, FIG. 2). The decision tree begins (block 905) by determining whether terrestrial station latitude is greater than zero (block 910). When terrestrial station latitude is greater than zero (i.e., the terrestrial station is in the Northern hemisphere), maximum satellite latitude is compared to minimum station latitude (block 915). When maximum satellite latitude is less than minimum station latitude, the visibility case is case 4 (block 917). Visibility case 4 corresponds to terrestrial station 610 and satellite ground path 614 (FIG. 6).

When maximum satellite latitude is not less than minimum station latitude, maximum satellite latitude is compared to maximum station latitude (block 920).

When maximum satellite latitude is greater than maximum station latitude, $(\delta+\alpha)$ is compared to $\pi/2$ (block 930), where $\delta$ (or DELTA, Eq. 1) represents geocentric terrestrial station latitude and $\alpha$ (or ALPHA, Eq. 3) represents the coverage angle associated with the terrestrial station's coverage perimeter. When $(\delta+\alpha)$ is less than $\pi/2$, the visibility case is case 3a (block 932); otherwise, the visibility case is case 1b (block 933). Visibility case 3a corresponds to terrestrial station 807 and satellite ground path 814 (FIG. 8) while visibility case 1b corresponds to terrestrial station 707 and satellite ground path 714 (FIG. 7).

When maximum satellite latitude is not greater than maximum station latitude (block 920), minimum satellite latitude is compared to minimum station latitude (block 925). When minimum satellite latitude is greater than minimum station latitude, the visibility case is case 1a (block 927); otherwise, the visibility case is case 2a (block 928). Visibility case 1a corresponds to terrestrial station 607 and satellite ground path 614 (FIG. 6) while visibility case 2a corresponds to terrestrial station 810 and satellite ground path 814 (FIG. 8).

When terrestrial station latitude is not greater than zero (i.e., the terrestrial station is in the Southern hemisphere) (block 910), minimum satellite latitude is compared to maximum station latitude (block 950). When minimum satellite latitude is greater than maximum station latitude, the visibility case is case 4 (block 917); otherwise, minimum satellite latitude is compared to minimum station latitude (block 955).

When minimum satellite latitude is less than minimum station latitude (block 955), $(|\delta|+\alpha)$ is compared to $\pi/2$ (block 965). When $(|\delta|+\alpha)$ is less than $\pi/2$, the visibility case is case 3b (block 968); otherwise, the visibility case is case 1c (block 967).

When minimum satellite latitude is not less than minimum station latitude, maximum satellite latitude is compared to maximum station latitude (block 960). When maximum satellite latitude is less than maximum station latitude, the visibility case is case 1a (block 927); otherwise, the visibility case is case 2b (block 962).

Rapid classification of satellite visibility at terrestrial stations into eight possible visibility cases is thus effected based on knowledge of maximum and minimum satellite and station latitudes, δ and α. The visibility case, and thus the number of orbit segments potentially visible, determines whether there are one or two ranges of visible ascension nodes.

Calculate First Range Of Visible Ascension Nodes

A "range of visible ascension nodes" or "visibility range" is defined herein to mean a range of longitudes along the equator, bounded by orbits that tangentially intersect the coverage perimeter. When a satellite (e.g., satellite 12, FIG. 1) crosses an ascension node within a visibility range, the satellite is visible to the terrestrial station on that orbit. When the satellite crosses an ascension node outside a visibility range, the satellite is not visible to the terrestrial station on that orbit.

Figure 10:
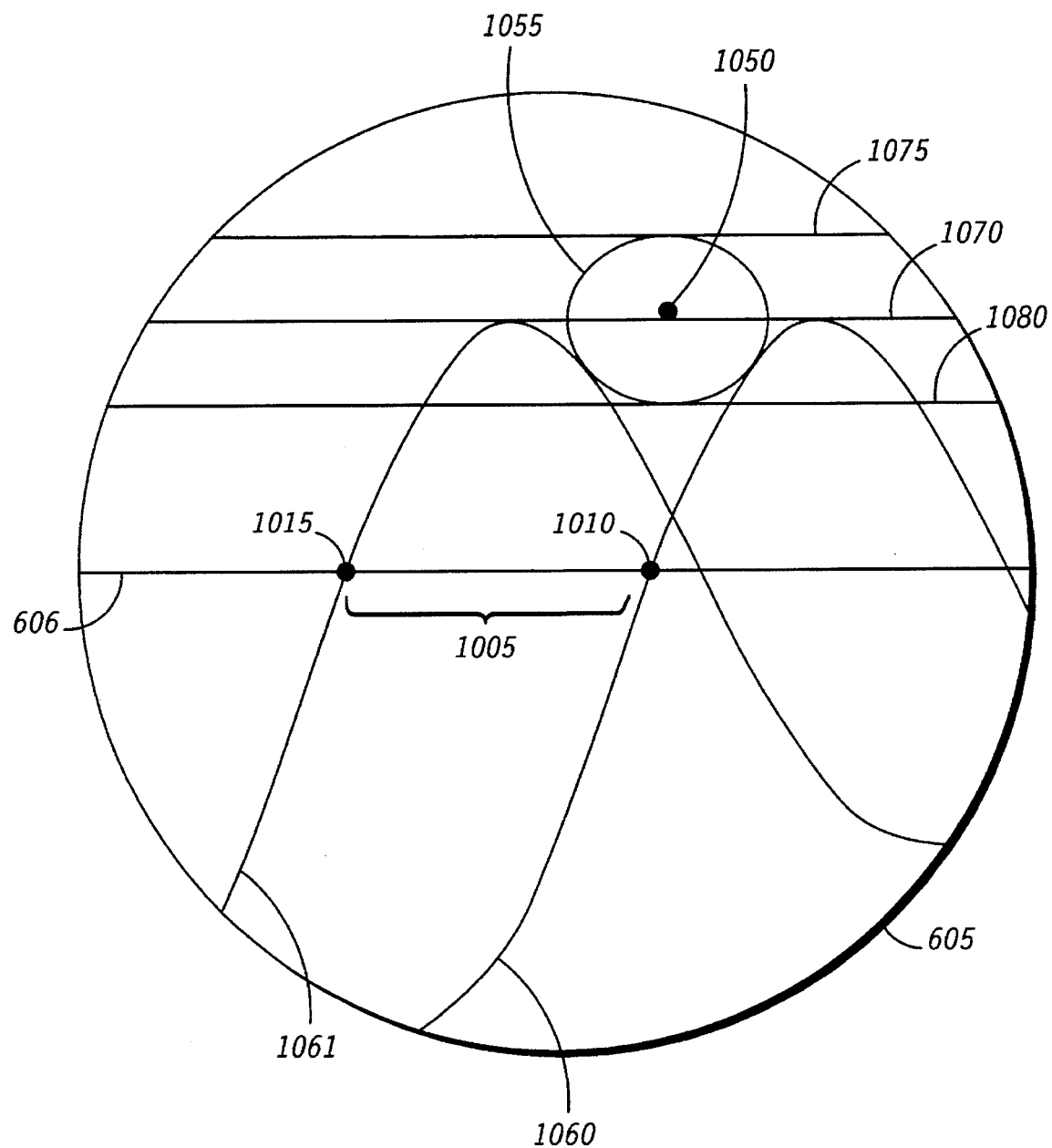
FIG. 10 shows a diagram of a first range of visible ascension nodes for visibility case 2a in accordance with the present invention.

FIG. 10 shows celestial body 605 having equator 606. For visibility case 2a, terrestrial station 1050 has associated coverage perimeter 1055. First ground path 1060 of a satellite is shown corresponding to a first time and second ground path 1061 is shown corresponding to a second time. Ground paths 1060, 1061 have maximum satellite latitude 1070 less than maximum station latitude 1075 and greater than minimum station latitude 1080. At most, one orbit segment each of ground paths 1060, 1061 are visible to terrestrial station 1050 on some orbits. Only a first range 1005 of visible ascension nodes exists because there is at most one orbit segment visible. First range of visible ascension nodes 1005 is bounded by first ascension node 1010 (referred to hereinafter as AN1) and second ascension node 1015 (referred to hereinafter as AN2). AN1 1010 is the ascension node for the easternmost orbit 1060 tangentially intersecting coverage perimeter 1055, while AN2 1015 is the ascension node for the westernmost orbit 1061 tangentially intersecting coverage perimeter 1055.

An analogous scenario, visibility case 2b (not illustrated in FIG. 10), occurs for a terrestrial station located in the Southern hemisphere.

Figure 11:
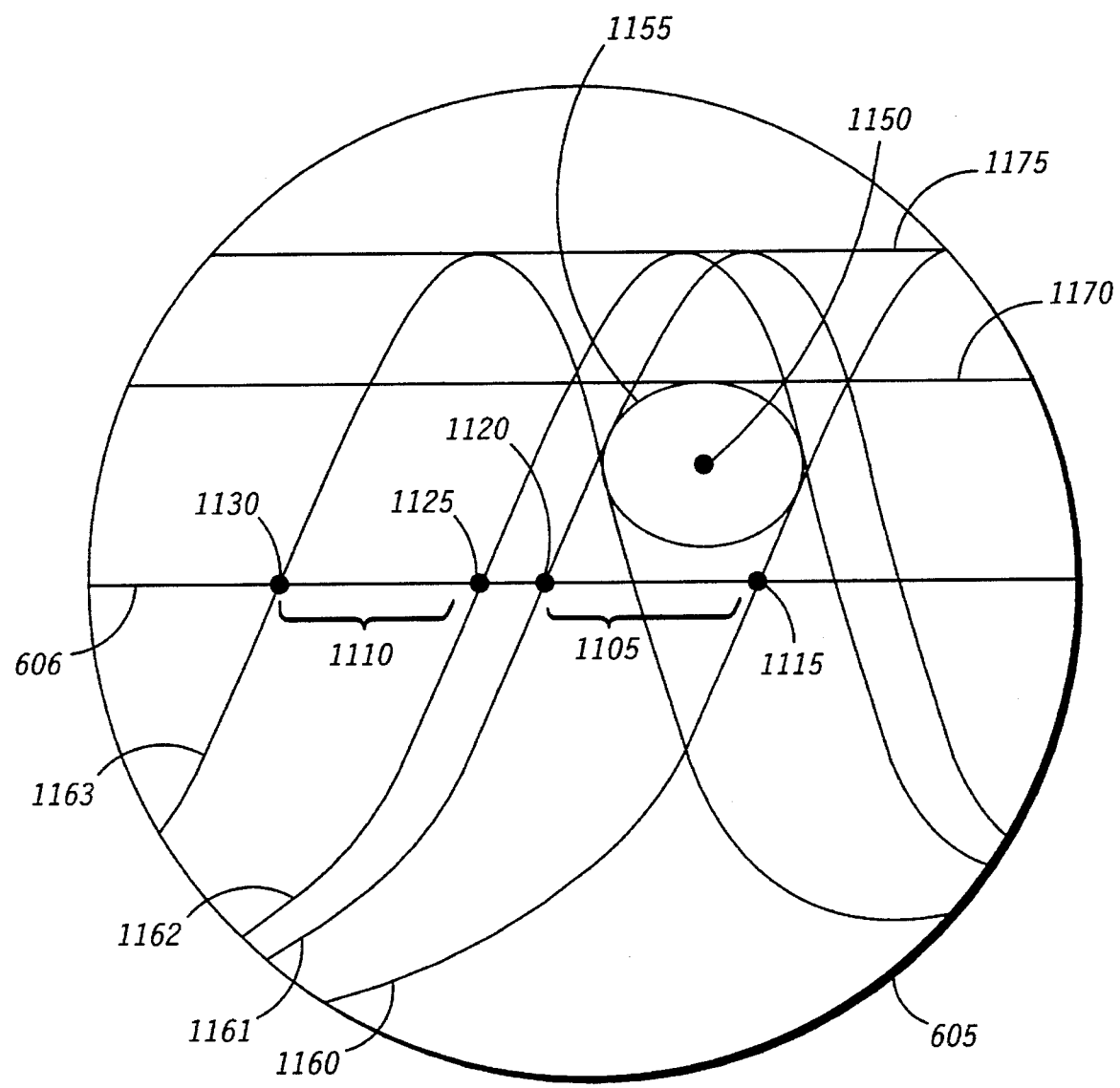
FIG. 11 shows a diagram of a first and a second range of visible ascension nodes for visibility case 3a in accordance with the present invention.

FIG. 11 illustrates visibility case 3a. Terrestrial station 1150 and associated coverage perimeter 1155 are located on celestial body 605 north of equator 606. Maximum satellite latitude 1175 is greater than maximum station latitude 1170. First ground path 1160 of a satellite is shown corresponding to a first time, second ground path 1161 is shown corresponding to a second time, third ground path 1162 is shown corresponding to a third time and fourth ground path 1163 is shown corresponding to a fourth time. At most, two orbit segments of any ground path are visible to terrestrial station 1150 during some orbits. First visibility range 1105 and second visibility range 1110 exist because two orbit segments are visible. First visibility range 1105 is bounded by AN1 1115 and AN2 1120. Second visibility range 1110 is bounded by third ascension node 1125 (referred to hereinafter as AN3) and fourth ascension node 1130 (referred to hereinafter as AN4).

An analogous scenario, visibility case 3b (not illustrated in FIG. 11), occurs when a terrestrial station is similarly located, but in the Southern hemisphere.

Figure 12:
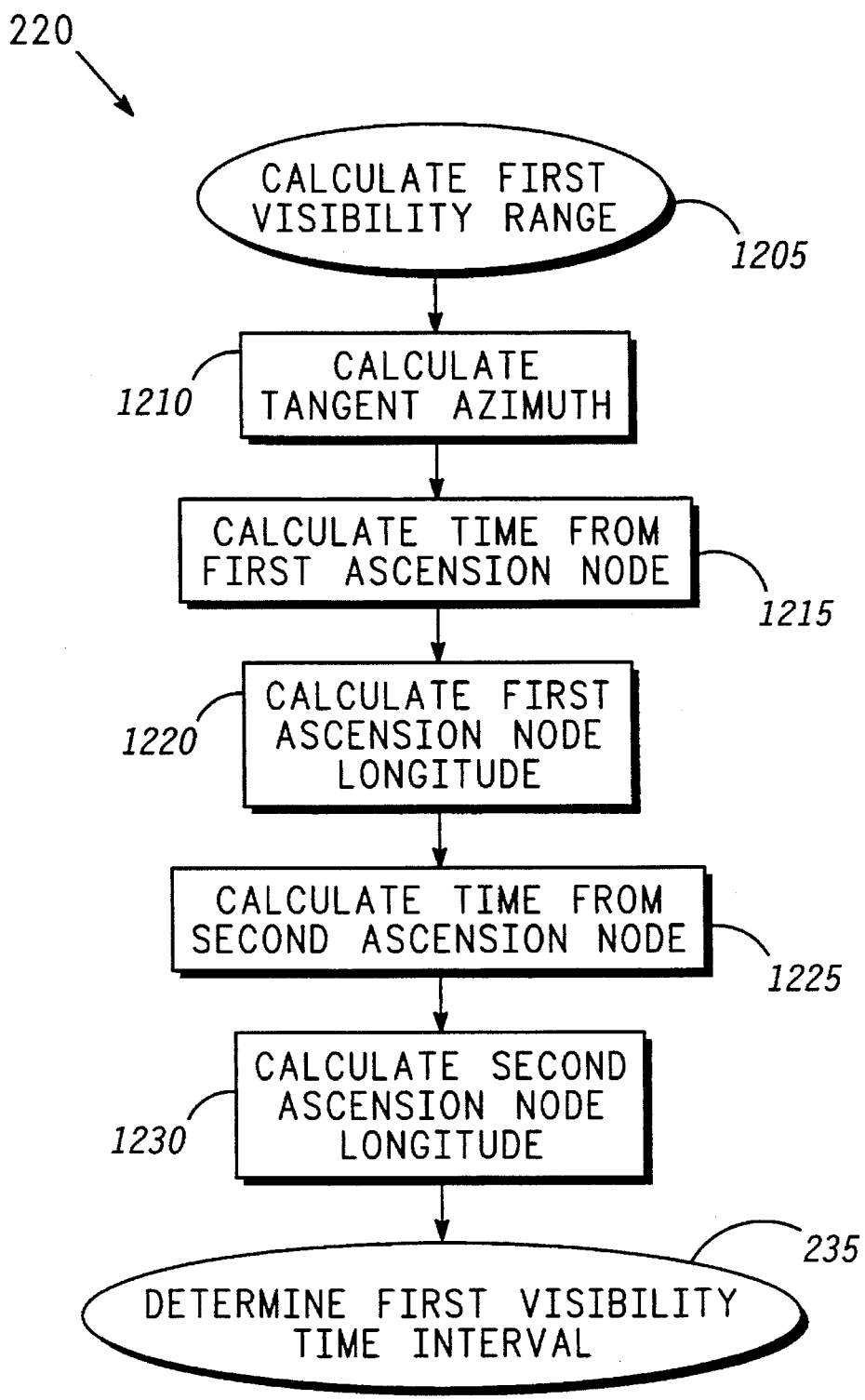
FIG. 12 illustrates a flow chart for calculating a first range of visible ascension nodes in accordance with the present invention.

FIG. 12 illustrates a flow chart of a procedure for calculating first visibility range 1105 (FIG. 11) in accordance with the present invention. First visibility range 1105 calculation begins (block 1205) with tangent azimuth calculation (block 1210). Tangent azimuth calculation determines a first orbit tangent to the visibility perimeter and a corresponding first tangent point. Calculation of satellite travel time from first tangent point to first tangent point (block 1215) (hereinafter referred to as "time from first ascension node") and first ascension node longitude calculations (block 1220) are then performed. Satellite travel time from second ascension node to second tangent point (block 1225) (hereinafter referred to as "time from second ascension node") and second ascension node longitude (block 1230) are then calculated. The procedure then exits (block 235). Tangent azimuth, time from first ascension node, first ascension node longitude, time from second ascension node and second ascension longitude node calculations are discussed in more detail in connection with FIGS. 12–16 and associated text.

It will be appreciated that the steps outlined hereinabove (blocks 1215, 1220, 1225, 1230) need not necessarily be carried out in the order represented here. For example, parameters associated with AN2 may be calculated (block 1230) before parameters associated with AN1 (block 1220) are calculated.

A. Calculate Tangent Azimuth

Figure 13:
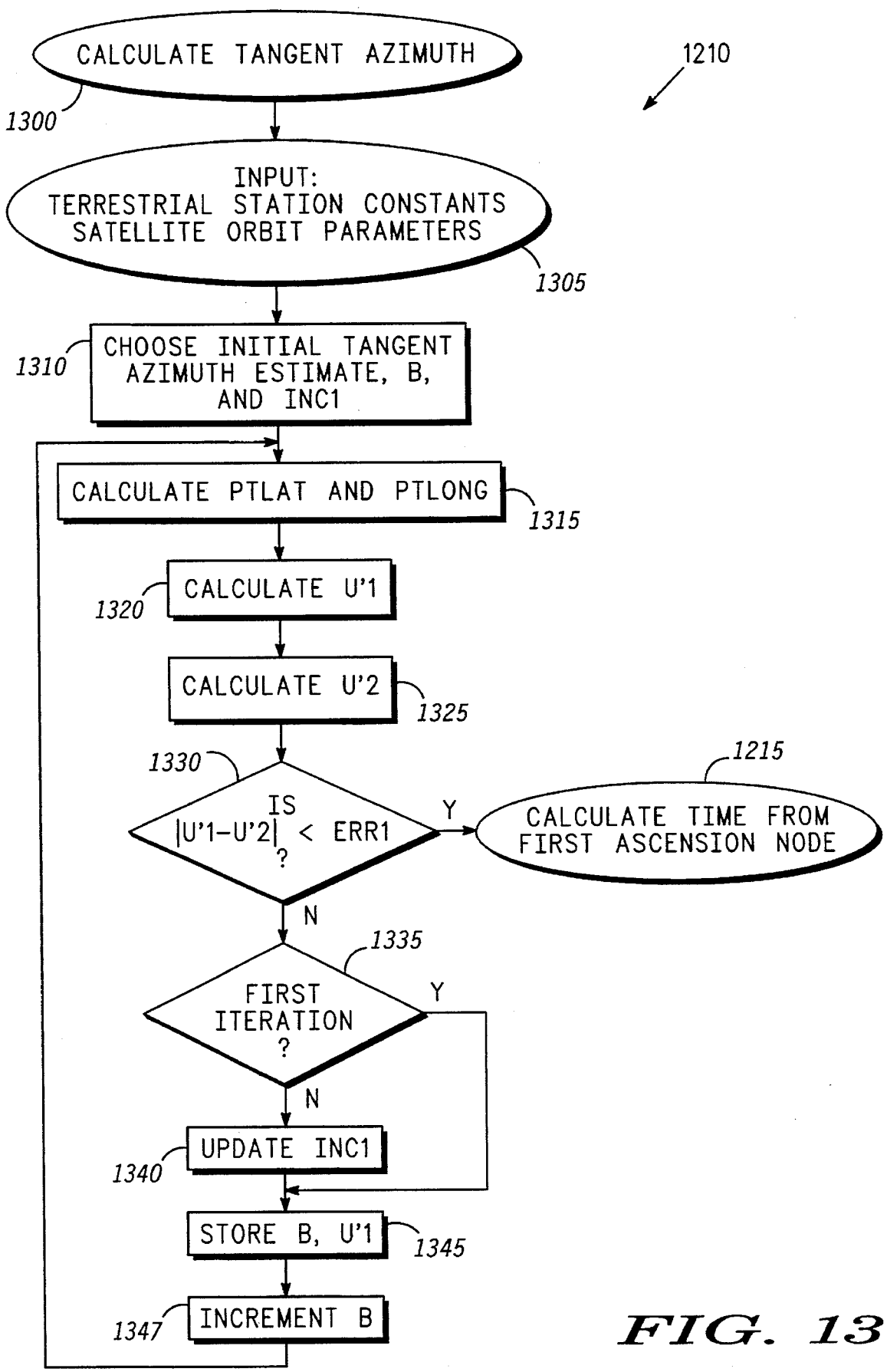
FIG. 13 illustrates a flow chart for calculating the tangent azimuth in accordance with the present invention.

FIG. 13 illustrates a flow chart of a procedure for calculating tangent azimuth (block 1210, FIG. 12) for terrestrial stations located in the Northern hemisphere in accordance with the present invention. "Tangent azimuth" is defined herein to mean an angle between a vector extending from the terrestrial station to a pole (e.g., the North pole) and a vector extending from the terrestrial station to a point on the coverage perimeter where the satellite ground path is tangent to the terrestrial station coverage perimeter. Similar calculations are performed to determine tangent azimuth for counterpart terrestrial stations located in the Southern hemisphere, as will be appreciated by those of skill in the art. Tangent azimuth may be calculated for any one of the two tangent points (when one orbit segment is visible) or for any one of the four tangent points (when two orbit segments are visible). For the example visibility case 2a (Table IV), tangent azimuth is desirably determined for the easternmost tangent point of the ascending (northbound) portion of the orbit.

Tangent azimuth calculation begins (block 1300) with input data (block 1305) comprising terrestrial station constants (e.g., Table I, supra) and satellite orbit parameters (e.g., Table II, supra). The method then chooses an initial tangent azimuth estimate (block 1310) (referred to hereinafter as B) and an initial value for INC1. Test point latitude (referred to hereinafter as PTLAT) and test point longitude (referred to hereinafter as PTLONG) of a test point on the coverage perimeter corresponding to B are calculated (block 1315), calculates angle U'1 (block 1320) and calculates angle U'2 (block 1325). B, PTLAT, PTLONG, angle U'1 and angle U'2 are described later in association with FIGS. 14 and 15, respectively. It will be appreciated by those of skill in the art to which the present invention pertains that calculating angle U'1 (block 1320) or calculating angle U'2 (block 1325) may be carried out in any order and that such calculations may be done independently, rather than first finding one and then using that value as a part of calculating the other.

A difference between angle U'1 and angle U'2 is calculated and tested (block 1330) to determine whether the difference is less than a predetermined value ERR1. When the difference is less than ERR1, tangent azimuth calculation has converged and the procedure terminates (block 1215).

Convergence criterion ERR1 is usefully less than $10^{-2}$ radians, desirably is less than $5.10^{-3}$ radians and preferably is less than $10^{-3}$ radians. When the difference (block 1330) is greater than or equal to convergence criterion ERR1, tangent azimuth calculation has not converged and a determination is made whether or not the iteration is an initial iteration (block 1335). When it is determined that a first iteration of the procedure is being carried out (block 1335), INC1 is not updated (there are no old angle U'1 and B values). When it is determined that a subsequent iteration is being carried out (block 1335), increment INC1 is updated (block 1340). An updated value for INC1 is desirably found in accordance with the Newton-Raphson method as:

$$INC1=(U'2-U'2)\{(B-B_{OLD})/(U'1_{OLD}-U'1)\}, \quad (4)$$

where $U'1_{OLD}$ is a previous value for angle U'1 and $B_{OLD}$ is a previous value for B. Angle U'1 and B then are stored in a storage medium (block 1345) (e.g., random access memory or RAM, other semiconductor or magnetic read-write memory devices, optical disk, magnetic tape, floppy disk, hard disk etc. ), replacing $U'1_{OLD}$ and $B_{OLD}$, respectively, and a new estimate of B is formed (block 1347) by adding INC1 thereto. The process then iterates (blocks 1315, 1320, 1325, 1330, 1335, 1340, 1345, 1347) until convergence is obtained. When convergence is obtained, the procedure exits (block 1215).

Figure 14:
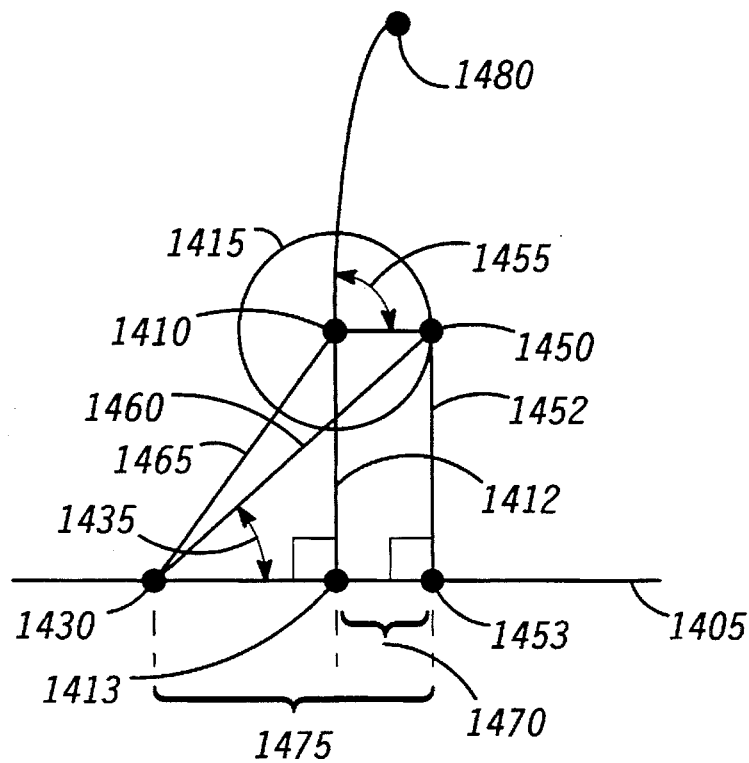
FIG. 14 shows a diagram depicting a first set of relevant angles and distances used to calculate the tangent azimuth in accordance with the present invention.

FIG. 14 shows angles relevant to the tangent azimuth calculation. For purpose of example, terrestrial station 1410 has associated coverage perimeter 1415 and is located between equator 1405 and north pole 1480. Terrestrial station 1410 has latitude 1412 and longitude 1413. A satellite (e.g., satellite 12, FIG. 1) has ascension node 1430 and travels through equator 1405 at angle of inclination 1435 (referred to hereinafter as I). Satellite ground path 1460 intersects coverage perimeter 1415 at test point 1450. Test point 1450 is associated with tangent azimuth estimate B 1455. B 1455 is the angle between North pole 1480, terrestrial station 1410 and test point 1450. Test point 1450 has latitude PTLAT 1452 and longitude PTLONG 1453. Line 1460 represents the angle between ascension node 1430, the center of the celestial body and test point 1450. Angle U'1 1465 subtends an angle formed between ascension node 1430, the center of the celestial body and terrestrial station 1410. Calculation (block 1315) of latitude PTLAT 1452 and longitude PTLONG 1453 is desirably realized through the relations:

$$PTLAT=Sin^{-1}[(sin\delta \cdot cos\alpha)+(cos\delta \cdot sin\alpha \cdot cosB)], \quad (5)$$

where $\delta$ (Eq. 1) represents terrestrial station latitude 1412 and $\alpha$ (Eq. 3) represents coverage angle (see FIG. 5 and associated text) and $$PTLONG=\text{station longitude}+\Delta Long, \quad (6a)$$

where station longitude is terrestrial station longitude 1413 and $\Delta$Long represents longitudinal difference 1470 between longitude PTLONG 1453 and station longitude 1413. $\Delta$Long 1470 is usefully calculated as:

$$\Delta Long=Cos^{-1}\{[cos\alpha-sin\delta \cdot sin(PTLAT)]/[cos\delta \cdot cos)PTLAT]\}. \quad (6b)$$

Angle U'1 1465 is desirably calculated (block 1320) as:

$$U'1=cos^{-1}[cos(u)\cdot cos\alpha], \quad (7a)$$

where u is defined as:

$$u=sin^{-1}[sin(PTLAT)/sin(I)]. \quad (7b)$$

Figure 15:
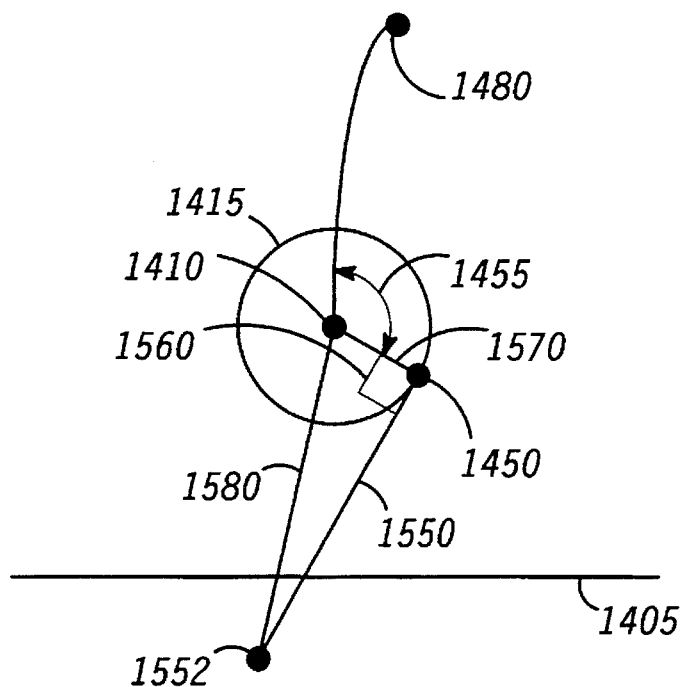
FIG. 15 shows a diagram depicting a second set of relevant angles and distances used to calculate the tangent azimuth in accordance with the present invention.

FIG. 15 shows additional angles relevant to tangent azimuth calculation (FIG. 13). FIG. 15 also shows terrestrial station 1410 with associated coverage perimeter 1415 located between equator 1405 and North pole 1480. Line 1550 intersects coverage angle 1570 at test point 1450 and is oriented at right angle 1560. Test point 1450 corresponds to tangent azimuth estimate B 1455. Angle U'2 1580 is the angle between terrestrial station 1410, the celestial body's center and end point 1552 of line 1550. Angle U'2 1580 is desirably calculated (block 1325) as:

$$U'2=Cos^{-1}\{cos\delta \cdot cos[\text{station longitude}-AN]\}, \quad (8a)$$

where AN represents longitude of ascension node 1430 and is represented as:

$$AN=PTLONG-\Delta L, \quad (8b)$$

where $\Delta L$ represents longitudinal difference 1475 between longitude PTLONG 1453 and the longitude of ascension node 1430. $\Delta L$ is usefully defined as:

$$\Delta L=Cos^{-1}\{cos(u)/cos(PTLAT)\}. \quad (8c)$$

Tangent azimuth is thus determined, yielding a latitude PTLAT and a longitude PTLONG of a point on an orbit tangent to the coverage perimeter and the ascension node longitude AN of that orbit. PTLAT, PTLONG and AN are used to determine the time from AN to the tangent point and the range of visible ascension nodes.

B. Calculate Time From Node

An ascension node longitude of a tangent orbit is calculated using Eq. 8b. However, AN in Eq. 8b does not account for the rotation of the Earth and the satellite orbit plane during the time (referred to hereinafter as "time from node") for the satellite (e.g., satellite 12, FIG. 1) to travel from ascension node 1430 to test point 1450, found during the converging iteration (block 1330, FIG. 13). Calculation of the true ascension node AN1 is offset from AN by a distance proportional to time from node.

Following convergence of tangent azimuth calculation (block 1210, FIG. 12), time from node is calculated (block 1215, FIG. 12). The test point 1450 found during the converging iteration is a point on an orbit tangent to the coverage perimeter. Time from node is found by first computing true $\upsilon_{SAT}$ and mean $M_{SAT}$ anomalies of the satellite orbit at the satellite location. True anomaly $\upsilon_{SAT}$ (angle between major axis of the orbital ellipse and a vector from a focus of the orbital ellipse to satellite position measured from perigee) is:

$$\upsilon_{SAT}=\omega-u_J, \quad (9a)$$

where argument of perigee $\omega$ represents an angle formed between the ascending node, Earth's center and satellite orbit perigee. Argument of latitude $u_J$ is an angle through which the satellite has traveled since the equatorial crossing and is usefully defined as:

$$u_J=sin^{-1}[sin(PTLAT_J)/sinI], \quad (9b)$$

where $PTLAT_J$ represents the latitude of the point on the coverage perimeter corresponding to the right ascension node, I represents the orbital inclination and J is a subscript identifying unique parameters for distinct points. Given satellite orbital eccentricity e and true anomaly $\upsilon_{SAT}$, satellite orbital eccentric anomaly $E_{SAT}$ is characterized by:

$$\cos(E_{SAT})=[\cos(\upsilon_{SAT})+e]/[1+e\cdot\cos(\upsilon_{SAT})] \quad (9c)$$

and $$\sin(E_{SAT})=(I-e^2)^{0.5}\sin(\upsilon_{SAT})/[1+e\cdot\cos(\upsilon_{SAT})]. \quad (9d)$$

The signs of $\cos(E_{SAT})$ and $\sin(E_{SAT})$ are used to determine what quadrant $E_{SAT}$ falls within.

Mean satellite orbit anomaly $M_{SAT}$ is found as:

$$M_{SAT}=E_{SAT}-e\cdot\sin(E_{SAT}). \quad (9e)$$

Similar calculations using $\upsilon_{NODE}$ as an argument provide satellite orbit eccentric anomaly $E_{NODE}$ (Eqs. 9c, 9d) and (using $E_{NODE}$ as an argument) mean anomaly $M_{NODE}$ (Eq. 9e) at the ascension node. $\upsilon_{NODE}$ is usefully represented as:

$$\upsilon_{NODE}=\upsilon_{SAT}-u_J. \quad (9f)$$

Time from node $TFN_j$ required for the satellite to travel from the ascension node to an edge of the coverage area is found from:

$$TFN_j=(M_{SAT}-M_{NODE})/mMotn, \quad (9g)$$

where mMotn represents the satellite mean motion, defined by:

$$mMotn=(\mu/a)^{0.5}, \quad (9h)$$

where μ represents the gravitational parameter of the celestial body and a represents the semi-major axis of the orbital ellipse.

Knowledge of time from node $TFN_j$ allows the rotation of the celestial body during that time to be accounted for when determining the ascension nodes bounding the visibility range.

C. Calculate Ascension Node

Figure 16:
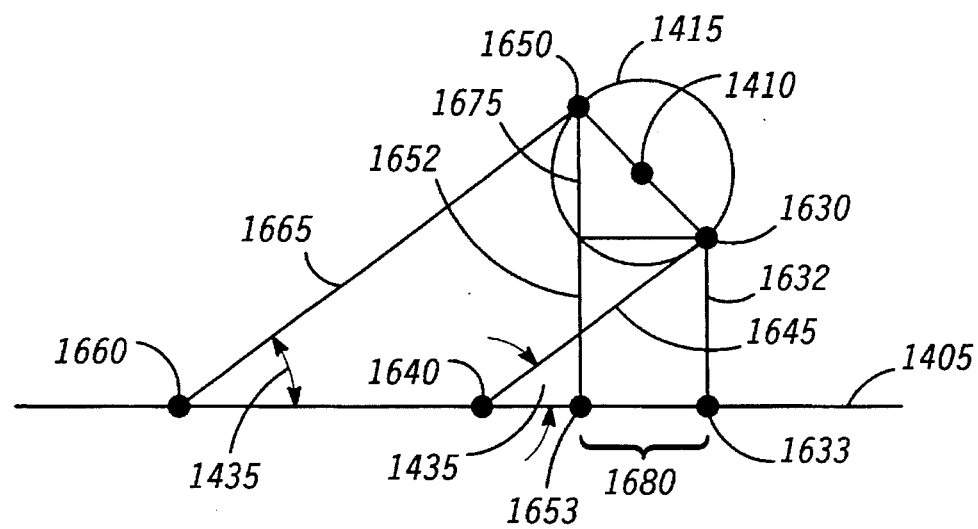
FIG. 16 shows a diagram depicting the relevant angles and distances used to calculate the second ascension node in accordance with the present invention.

FIG. 16 shows terrestrial station 1410 (FIG. 14) with associated coverage perimeter 1415 (FIG. 14) located north of equator 1405 (FIG. 14). First tangent point 1630 is connected to AN1 1640 by line 1645. Orbital angle of inclination I of a satellite at AN1 1640 is represented as angle 1435. First tangent point 1630 has associated latitude (represented by the length of line 1632) and longitude (represented by point 1633). The longitude of AN1 1640 is usefully calculated (block 1220) as:

$$AN1=AN+N_{RATE}\cdot TFN_1, \quad (10a)$$

where AN represents the longitude of ascension node 1430 (FIG. 14) found during the converging tangent azimuth iteration (Eq. 8b), $N_{RATE}$ represents the node rate (i.e., the algebraic sum of the Earth's and the satellite's orbit plane rotation rates) and $TFN_1$ (Eqs. 9a–9h) represents the time it takes for the satellite to travel from ascension node 1640 to first tangent point 1630. Eq. 9b uses PTLAT (Eq. 5) from the converging tangent azimuth iteration.

FIG. 16 also shows second tangent point 1650 connected to AN2 1660 by line 1665. Orbital angle of inclination I of a satellite at AN2 1660 is represented by angle 1435. Second tangent point 1650 has associated latitude 1652 and longitude 1653. AN2 1660 may be calculated similar to the calculation of AN1 1640. However, during calculation of tangent azimuth for AN2 1660, tangent azimuth estimate is decremented rather than incremented (as in block 1340, FIG. 13).

Ascension nodes AN1 and AN2 bounding a first range of visible ascension nodes have thus been determined. AN1 and AN2 correspond to orbits tangentially intersecting the coverage perimeter. For visibility cases where only one orbit segment is potentially visible (e.g., cases 2a and 2b), only two tangent orbits exist, thus there is only one visibility range. For visibility cases where two orbit segments are potentially visible (e.g., cases 3a and 3b), four tangent orbits exist, thus there are two visibility ranges.

Calculate Second Range of Visible Ascension Nodes

For visibility cases 3a and 3b (Table IV), first 1105 and second 1110 visibility ranges (FIG. 11) exist. First visibility range 1105 is calculated in exactly the same manner as the calculation of first visibility range for visibility cases 2a and 2b (see FIG. 12 and associated text). Second visibility range 1110 may be computed as follows.

For visibility cases 3a and 3b, third ascension node AN3 is defined as:

$$AN3=PTLONG_2+2\cdot\Delta Long_2-(\pi-\Delta L_2)+N_{RATE}\cdot TFN_3, \quad (10b)$$

where $PTLONG_2$ (Eq. 6a), $\Delta Long_2$ (Eq. 6b) and $\Delta L_2$ (Eq. 8c) are parameters determined during calculation of AN2, $N_{RATE}$ represents the node rate and $TFN_3$ (Eqs. 9a–9h) represents the time it takes for the satellite to travel from AN3 to a third tangent point. Fourth ascension node AN4 is defined as:

$$AN=PTLONG+2\cdot\Delta Long_1-(\pi-\Delta L_1)+N_{RATE}\cdot TFN_4, \quad (10c)$$

where $PTLONG_1$ (Eq. 6a), $\Delta Long_1$ (Eq. 6b) and $\Delta L_1$ (Eq. 8c) are parameters determined during calculation of AN1, $N_{RATE}$ represents the node rate and $TFN_4$ (Eqs. 9a–9h) represents the time it takes for the satellite to travel from AN4 to a fourth tangent point.

Other similar methods of tangent azimuth calculation may be substituted as is appreciated by those of skill in the art.

After visibility ranges have been determined, the time may be calculated for the satellite to travel from its current position, to arrive within one of the visibility ranges and then to intersect the coverage perimeter.

Calculate First Visibility Time Interval

Figure 17:
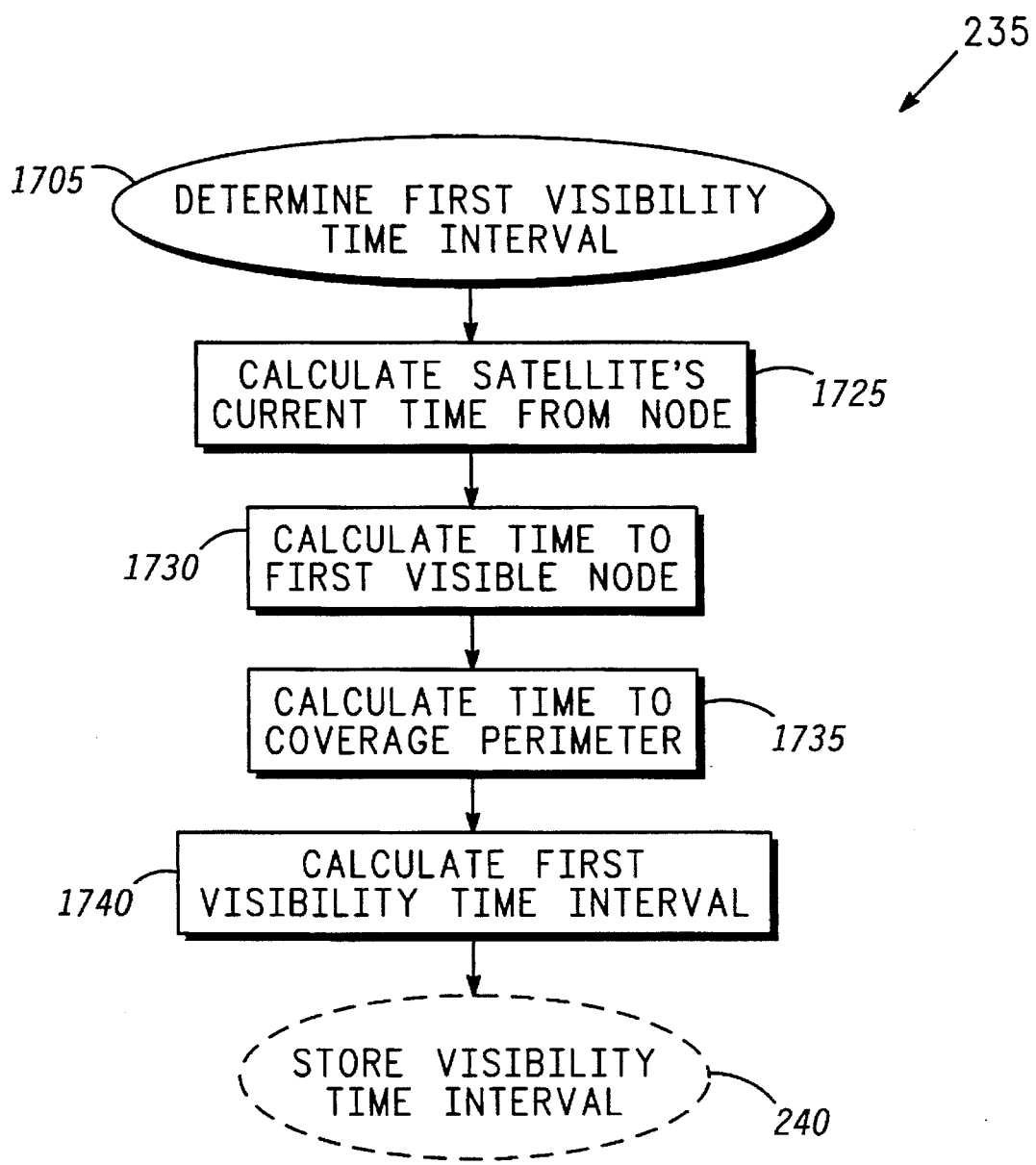
FIG. 17 illustrates a flow chart for calculating the first visibility time interval in accordance with the present invention.

FIG. 17 illustrates a flow chart of a procedure for determining a first visibility time interval. Determination of the first visibility time interval (block 235) begins (block 1705) with calculation of the satellite's current time from node TFN (block 1725) (Eqs. 9a–9h), time to first visible node (block 1730) and time to coverage perimeter (block 1735), which are substeps leading to calculation of the first visibility time interval (block 1740). Following calculation of first visibility time interval (block 1740), the procedure terminates (block 240).

It will be appreciated that the steps outlined hereinabove (blocks 1725, 1730, 1735) need not necessarily be carried out in the order represented here. For example, calculation of time from node TFN (block 1725), time to first visible node (block 1730) and time to coverage perimeter (block 1735) may be performed in any convenient order.

Figure 18:
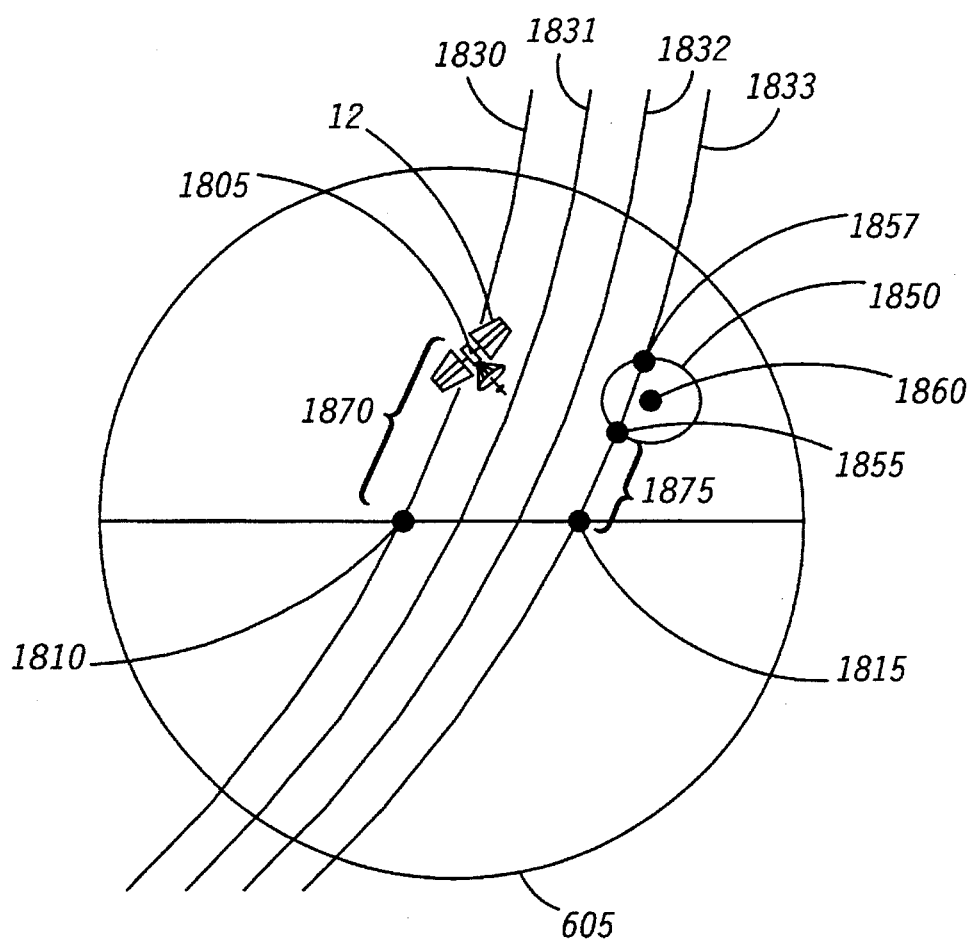
FIG. 18 shows a diagram depicting the segments of a satellite's orbit that are analyzed to calculate the first visibility time in accordance with the present invention.

FIG. 18 illustrates the portions of the satellite's orbit relevant to calculating first visibility time. A satellite (e.g., satellite 12, FIG. 1) orbits celestial body 605 having terrestrial station 1860 thereon. Calculations of first visibility interval assume knowledge of current satellite position 1805. "Current ascension node" 1810 is defined herein to mean the ascension node that satellite 12 has traveled through on a current orbit 1830. "First visible ascension node" 1815 is defined herein to mean the first future ascension node satellite 12 travels through when satellite 12 intersects coverage perimeter 1850 on that orbit. Satellite 12 is first visible to terrestrial station 1860 at ingress point 1855. Satellite 12 exits coverage perimeter 1850 and is last visible to terrestrial station 1860 at egress point 1857. The first visibility interval is bounded by time of day $TOD_{RISE}$ when satellite 12 reaches ingress point 1855 and time of day $TOD_{SET}$ satellite 12 reaches egress point 1857. The difference between $TOD_{RISE}$ and $TOD_{SET}$ is duration of visibility DUR. $TOD_{RISE}$ defines the earliest time when terrestrial station 1860 and satellite 12 may initiate direct radio communications therebetween and DUR defines the maximum duration thereof. The method of communication may predetermine whether an entire message may be transmitted within DUR. If the entire message cannot be transmitted within DUR, an alternative to communicating the entire message during this satellite pass over terrestrial station 1860 may be chosen (e.g., waiting to transmit until an adequate DUR occurs on a later satellite pass, or transmitting only a portion of the message during this pass etc.).

Portions of the satellite's orbit relevant to calculation of the first visibility interval are:

i) distance 1870 satellite 12 has traveled to reach current position 1805 since traveling through current ascension node 1810;

ii) number of orbital revolutions REVS 1830, 1831, 1832, 1833 satellite 12 travels from current ascension node 1810 to first visible ascension node 1815;

iii) distance 1875 satellite 12 travels from first visible ascension node 1815 to ingress point 1855 of coverage perimeter 1850; and iv) the distance satellite 12 travels from ingress point 1855 to egress point 1857, or alternately, the distance from first visible ascension node 1815 to egress point 1857.

A. Calculate Time From Current Node to Current Satellite Position

Calculation of first visibility time interval (block 40, FIG. 17) requires determination of time from node $TFN_{CURR}$ (block 1725, FIG. 17) (Eqs. 9a–9h) that a satellite (e.g., satellite 12, FIG. 1) has spent traveling from current ascension node 1810 to current satellite position 1805.

B. Calculate Time to First Visible Node

Time to first visible node $TVN_1$ (block 1730, FIG. 17) represents time taken for a satellite (e.g., satellite 12, FIG. 1) to travel from current ascension node 1810 to first visible ascension node 1815 (assuming that the current orbit's node longitude is outside a visibility range). $TVN_1$ is found by first calculating number of revolutions REVS (e.g., 1830, 1831, 1832, 1833) from current ascension node 1810 to first visible ascension node 1815:

$$REVS = \text{integer } [(NLong_0 - AN1)/N_{REV}], \qquad (11)$$

where $NLong_0$ represents the longitude of current ascension node 1810 and $N_{REV}$ represents the angular distance in the equatorial plane that the node travels through during one orbit period, defined by:

$$N_{REV} = N_{RATE} \cdot PER_{SAT}, \qquad (12)$$

where $N_{RATE}$ represents angular velocity of the node and $PER_{SAT}$ is defined by:

$$PER_{SAT} = (2 \cdot \pi \cdot a^{1.5})/(\mu)^{0.5}. \qquad (13)$$

$TVN_1$ is then:

$$TVN_1 = TOD_{NODE} + REVS \cdot PER_{SAT}, \qquad (14)$$

where $TOD_{NODE}$ is a variable representing a time that a satellite passes through an ascension node, initially set to the time when the satellite passed through current ascension node 1810.

Longitude $NLong_1$ of first visible ascension node 1815 is usefully calculated as:

$$NLong_1 = NLong_0 + N_{RATE} \cdot REVS. \qquad (15)$$

Calculation of $NLong_1$ is useful during calculation of time to coverage perimeter (Eq. 17).

C. Calculate Time to Coverage Perimeter

Figure 19:
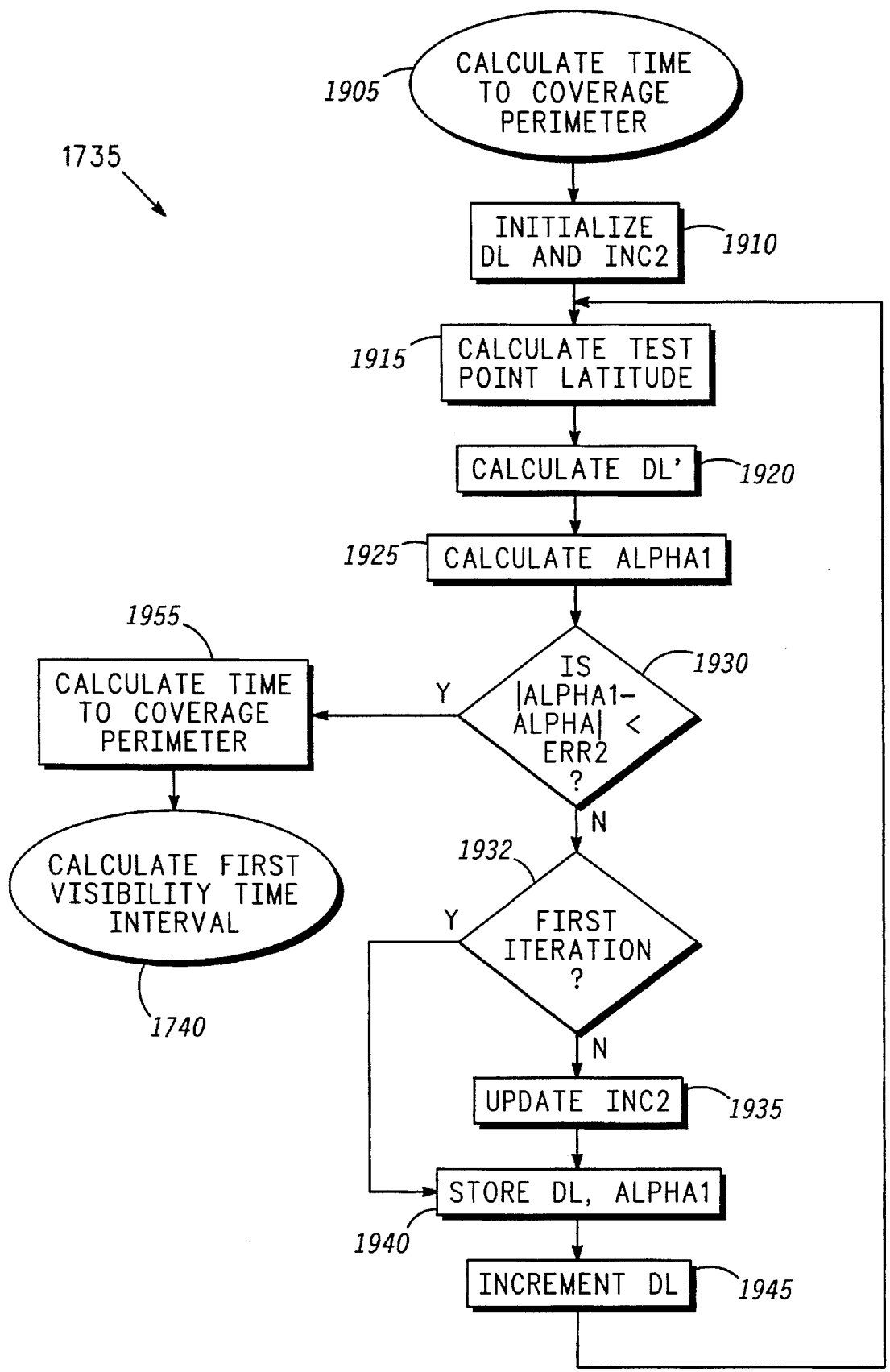
FIG. 19 illustrates a flow chart for calculating the time to coverage perimeter in accordance with the present invention.

FIG. 19 illustrates a flow chart of a method for calculating time for a satellite to travel from a visible ascension node to a coverage perimeter (block 1735, FIG. 17) in accordance with the present invention.

Calculation of time to coverage perimeter (block 1735) begins (block 1905) by initializing a latitude (referred to hereinafter as THETA) of a test point (referred to hereinafter as TP1) to the minimum station latitude. An initial latitude increment (referred to hereinafter as INC2) is also initialized (block 1910). INC2 represents the latitude step size that the test point is moved for successive iterations of time to coverage perimeter calculation. Next, angle u along the satellite's orbit path from the equator to the test point is calculated (block 1915) and a longitude difference (referred to hereinafter as DL') between TP1 and a terrestrial station longitude is calculated (1920). The angle (referred to hereinafter as ALPHA1) between the terrestrial station, the center of the celestial body and TP1 is then calculated (block 1925). A difference between ALPHA1 and coverage angle ALPHA (Eq. 3) (also referred to herein as α) is compared to a predetermined error value ERR2 (block 1930). When the difference between ALPHA1 and ALPHA is less than ERR2 (block 1930), time $T_{PERIM}$ that a satellite has spent traveling from the visible ascension node to the coverage perimeter is calculated (block 1955) and the procedure exits (block 1740). When the difference between ALPHA1 and ALPHA is greater than ERR2 (block 1930), a determination is made whether a first iteration is being carried out (block 1932). When the current iteration is not a first iteration (block 1932), INC2 is updated (block 1935) and when the current iteration is a first iteration (block 1932), INC2 is not updated. Values of THETA and ALPHA1 are then stored (block 1940) and THETA is incremented (block 1945). Steps 1915, 1920, 1925 and 1930 are repeated until the difference between ALPHA1 and ALPHA is less than ERR2 (block 1930). Variables DL, INC2, test point latitude, DL' and ALPHA1 are further discussed in association with FIG. 20 and associated text.

Figure 20:
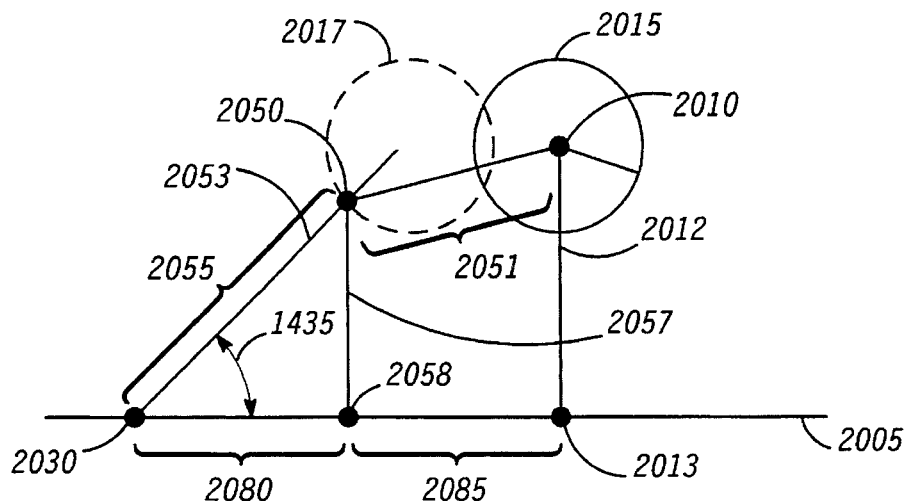
FIG. 20 shows a diagram depicting the relevant angles and distances used to calculate the time to coverage perimeter in accordance with the present invention.

FIG. 20 illustrates the geometry relevant to calculation of time to coverage perimeter. Terrestrial station 2010 has associated coverage perimeter 2015 and is located north of equator 2005. Coverage perimeter 2015 shows the actual location including the celestial body and satellite orbit plane rotation. Terrestrial station 2010 has latitude 2012 and longitude 2013. A satellite (e.g., satellite 12, FIG. 1) has ascension node 2030 and travels across equator 2005 at angle of inclination I 1435 (FIG. 14). First test point TP1 2050 along satellite ground path 2053 has latitude 2057 and longitude 2058. Angle 2055 is an angle between ascension node 2030, the center of the celestial body and TP1 2050. Angle ALPHA1 2051 is the angle between TP1 2050, the center of the celestial body and terrestrial station 2010. Range 2080 represents longitudinal difference DL between TP1 longitude 2058 and ascension node 2030. Range 2085 represents longitudinal distance DL' between TP1 longitude 2058 and terrestrial station longitude 2013.

1. Initialize test point latitude

The latitude represented by the length of line 2057 may be initialized (block 1910) to station minimum latitude. An increment INC2 (block 1910) also must be initialized. INC2 is usefully initialized to 5°.

2. Calculate test point orbit angle u

Test point angle 2055 is then calculated (block 1915). Test point angle 2055 (referred to hereinafter as u) is usefully represented as:

$$u = \mathrm{Sin}^{-1}(\sin(THETA)/\sin(I)). \quad (16)$$

3. Calculate DL

DL 2080 is then calculated (block 1920) for the terrestrial station position when the satellite reaches TP1 2050 (taking Earth and satellite orbit plane rotation into account).

$$DL = \mathrm{Cos}^{-1}(\cos(u)/\cos(THETA)). \quad (17a)$$

Revised station longitude DL' 2085 is usefully calculated as:

$$DL' = \text{Station Longitude} - N_{RATE} \cdot TFN_J - (N\mathrm{Long}_1 + DL), \quad (17b)$$

where $TFN_J$ represents the time for the satellite to travel from ascension node 2030 to TP1 2050 (Eqs. 9a–9h). $N\mathrm{Long}_1$ represents ascension node longitude 2030 (Eq. 15).

4. Calculate ALPHA1

ALPHA1 2051 is the angle between TP1 2050, the center of the celestial body and revised location of terrestrial station 2010. ALPHA1 2051 is calculated (block 1925) as:

$$\mathrm{ALPHA1} = \mathrm{Cos}^{-1}\{[\sin\phi \cdot \sin\delta] + [\cos\phi \cdot \cos\delta \cdot \cos(DL')]\}. \quad (18)$$

5. Determine convergence

The absolute value of the difference between angles ALPHA1 and ALPHA (Eq. 3) is compared to predetermined quantity ERR2 (block 1930), which is usefully less than $10^{-1}$ radians, desirably less than $10^{-2}$ radians and preferably is about $10^{-3}$ radians. When the difference is less than ERR2 (block 1930), the intersection of orbit ground path 2053 and coverage perimeter 2015 is adequately known and time to coverage perimeter $T_{PERIM}$ is then calculated (block 1955).

6. Calculate time to coverage perimeter

Time to coverage perimeter $T_{PERIM}$ is calculated (block 1955) using test point latitude 2057 (Eq. 16) and DL 2080 to calculate Time From Node $TFN_J$ (Eqs. 9a–9h) and the process then terminates (block 1740, FIG. 17).

7. Update INC2 when not first iteration

When the difference between ALPHA1 and ALPHA exceeds ERR2 (block 1930) and when it is determined (block 1932) that a second or later iteration of the procedure is being carried out, INC2 is updated (block 1935). When it is determined (block 1932) that a first iteration is being carried out, increment INC2 is not updated.

INC2 is usefully updated in accordance with the Newton-Raphson method:

$$\mathrm{INC2} = (\mathrm{ALPHA1} - \mathrm{ALPHA})\{(THETA - THETA_{OLD})/(\mathrm{ALPHA1} - \mathrm{ALPHA1}_{OLD})\}, \quad (19)$$

where $THETA_{OLD}$ and $\mathrm{ALPHA1}_{OLD}$ are previous values of THETA and ALPHA1, respectively.

8. Store THETA and ALPHA1

Current values for THETA and ALPHA1 are stored (block 1940) in $THETA_{OLD}$ and $\mathrm{ALPHA1}_{OLD}$, respectively.

9. Increment THETA

THETA is incremented (block 1945) by algebraically adding INC2.

The process then iterates (blocks 1915, 1920, 1925, 1930, 1932, 1935, 1940, 1945) until the difference is determined (block 1930) to be less than ERR2.

Time $T_{PERIM}$ for a satellite to travel from visible node 2030 to coverage perimeter 2015 is thus readily calculated using an iterative process.

D. Calculate First Visibility Time Interval

The first visibility time interval may be defined by $TOD_{RISE}$ and $TOD_{SET}$ or by $TOD_{RISE}$ and duration DUR. The first time $TOD_{RISE}$ a satellite (e.g., satellite 12, FIG. 1) is visible to the terrestrial station is found as:

$$TOD_{RISE} = TOD_{NODE} + TVN_1 + T_{PERIM}, \quad (20)$$

where $TOD_{NODE}$ represents time of day initialized to the time of ascension of current orbit 1830 (FIG. 18), $TVN_1$ represents the time the satellite takes to travel from current node 1810 to first visible node 1815 (block 1730, FIG. 17), $T_{PERIM}$ represents the time the satellite takes to travel from first visible node 1815 to coverage perimeter 1850 (block 1735, FIG. 17).

The last time the satellite is visible to the terrestrial station $TOD_{SET}$ is calculated in the same manner as $TOD_{RISE}$, as will be appreciated by those of skill in the art. DUR may be calculated as the difference between $TOD_{RISE}$ and $TOD_{SET}$.

Determine Next Visibility Time Interval

Figure 21:
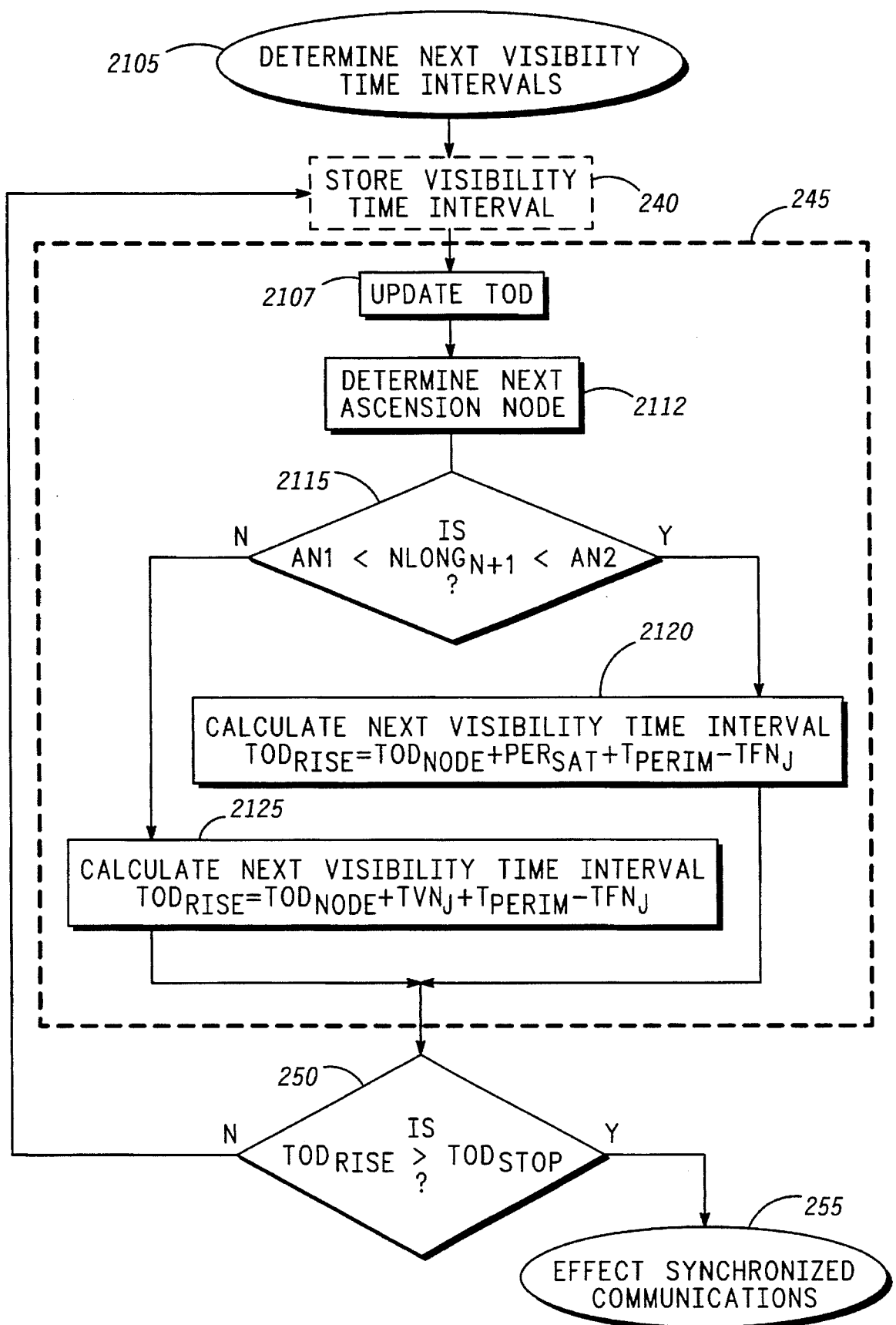
FIG. 21 illustrates a flow chart showing steps in determining next visibility time intervals in accordance with the present invention.

FIG. 21 illustrates a flowchart showing steps in calculating subsequent (next) visibility time intervals in accordance with the present invention (blocks 240, 245, 250, FIG. 2). The process begins (block 2105) by storing visibility time intervals (block 240), if desired. In a preferred embodiment of the present invention, $TOD_{NODE}$ is updated (block 2107) to represent revised ascension time $TVN_J$ (Eq. 14).

Next ascension node $N\mathrm{Long}_{N+1}$ is then calculated (block 2112). Next ascension node $N\mathrm{Long}_{N+1}$ is given by:

$$N\mathrm{Long}_{N+1} = N\mathrm{Long}_N + N_{REV}, \quad (21)$$

where $N\mathrm{Long}_N$ represents the longitude of the current node (Eq. 15) and $N_{REV}$ represents the longitudinal distance the node travels during one revolution of a satellite (Eq. 12).

Because subsequent calculated visibility time intervals depend on $NLong_{N+1}$, $NLong_{N+1}$ is tested (block 2115) to determine whether or not $NLong_{N+1}$ is within a range of the visible ascension nodes. Block 2115 tests whether $NLong_{N+1}$ is within a first range of visible ascension nodes (e.g., range 1005, FIG. 10). A test may also be performed (e.g., when two ranges of visible ascension nodes exist) to determine whether $NLong_{N+1}$ is within a second range of visible ascension nodes (e.g., range 1110, FIG. 11). When $NLong_{N+1}$ is within a range of visible ascension nodes (e.g., $AN1 < NLong_{N+1} < AN2$) a satellite (e.g., satellite 12, FIG. 1) will enter the coverage area on the very next orbit. The next $TOD_{RISE}$ calculation is very similar to the first $TOD_{RISE}$ calculation (Eq. 20) except that one satellite period is substituted for time to first visible node $TVN_1$ (block 2120):

$$TOD_{RISE} = TOD_{NODE} + PER_{SAT} + T_{PERIM}. \quad (22a)$$

When $NLong_{N+1}$ is not within a range of visible ascension nodes (e.g., $NLong_{N+1} < AN2$ or $NLong_{N+1} > AN1$), the satellite does not intersect the coverage perimeter on the next orbit. In this case, Eq. 22a is modified by substituting time to next visible node $TVN_j$ for satellite period $PER_{SAT}$ (block 2125):

$$TOD_{RISE} = TOD_{NODE} + TVN_j + T_{PERIM}. \quad (22b)$$

where $TVN_j$ is calculated in the same manner as time to first visible node $TVN_1$ (Eq. 14).

When $TOD_{RISE}$ is less than stop time $TOD_{STOP}$ of the requested planning period (block 250), the process iterates (blocks 240, 2107, 2112, 2115, 2120 or 2125, 250). When $TOD_{RISE}$ falls outside the requested planning period (block 250), the process terminates (block 255). Alternatively, the process terminates when a predetermined number of visibility time intervals have been calculated, for example.

Effect Synchronized Communications

Figure 22:
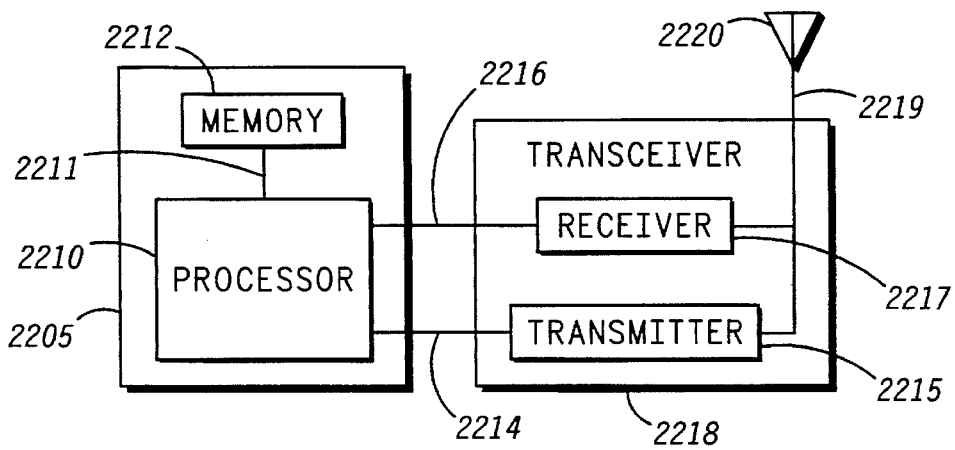
FIG. 22 is a simplified schematic diagram of a portion of a terrestrial station in accordance with the present invention.

FIG. 22 is a simplified schematic diagram of portion 2205 of a control station (e.g., SCS 28, FIG. 1) and transceiver 2218 of a terrestrial station (e.g., ET 24, FIG. 1) in accordance with the present invention. Portion 2205 includes processor 2210 coupled to associated storage medium 2212 (e.g., random access memory or RAM, other semiconductor or magnetic read-write memory devices, optical disk, magnetic tape, floppy disk, hard disk etc.) via link 2211. Antenna(e) 2220 is coupled to transceiver 2218 via link 2219. Transceiver 2218 comprises transmitter 2215 and receiver 2217 coupled to processor 2210 via links 2214 and 2216, respectively. Processor 2210 carries out procedures exemplified in FIGS. 2, 3, 9, 12–13, 17, 19 and 21 and described in associated text, for example, in addition to performing other tasks as appropriate and stores results from such procedures in storage medium 2212, for example. Transmitter 2215 and/or receiver 2217 transmit messages to and/or receive messages from satellites in accordance with visibility time intervals computed as described in connection with procedures exemplified in FIGS. 2, 3, 9, 12–13, 17, 19 and 21, for example.

Figure 23:
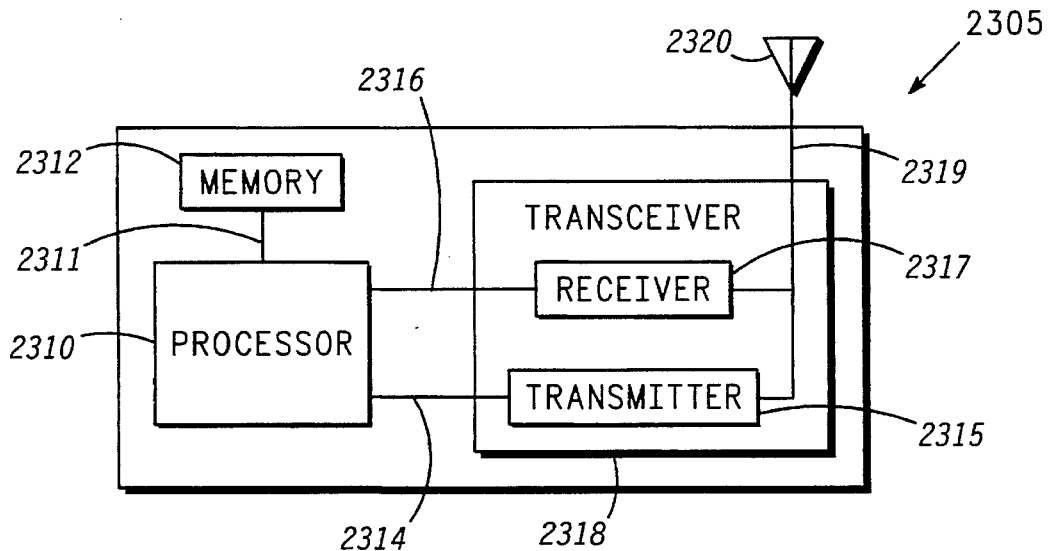
FIG. 23 is a simplified schematic diagram of a portion of a satellite in accordance with the present invention.

FIG. 23 is a simplified schematic diagram of portion 2305 of a satellite (e.g., satellite 12, FIG. 1) in accordance with the present invention. Portion 2305 desirably includes processor 2310 coupled to associated storage medium 2312 (e.g., random access memory or RAM, other semiconductor or magnetic read-write memory devices, optical disk, magnetic tape, floppy disk, hard disk etc.) via link 2311 and also includes antenna(e) 2320 coupled to transceiver 2318 via link 2319. Transceiver 2318 comprises transmitter 2315 and receiver 2317 coupled to processor 2310 via links 2314 and 2316, respectively. Receiver 2317 receives messages transmitted by terrestrial stations (e.g., ETs 24, FIG. 1) and/or from other satellites (e.g., satellites 12, FIG. 1) which are processed by processor 2310. It will be appreciated that some communication systems may employ "dumb" satellites which perform a transponder function, i e , act as a "bent pipe" for simply relaying one or more messages between points on Earth or for inter-satellite communications links.

Such messages may include data such as transmitter on/off timed commands, or visibility time intervals calculated in accordance with procedures exemplified in FIGS. 2, 3, 9, 12–13, 17, 19 and 21 and associated text, which data are stored in storage medium 2312, for example. In a preferred embodiment of the present invention, such data are subsequently used to control (turn on, off or point, for example) transmitter 2315, receiver 2317 and/or antenna(e) 2320 in order to synchronize communications between satellites and terrestrial stations, for example. In an alternative embodiment, the procedures exemplified in FIGS. 2, 3, 9, 12–13, 17, 19 and 21 and associated text are carried out by processor 2310, providing visibility information directly within the satellite.

EXAMPLE

An example of the utility of the technique of the instant invention is illustrated by estimating a lower bound for time savings realized therethrough as compared to conventional step-then-check methods. Table V provides an example of satellite and terrestrial station parameters for comparing computation times.

TABLE V

| SYSTEM VALUES FOR COMPARISON CALCULATION | |
|---|---|
| Parameter | Symbol and Value |
| Orbit period | OP = 100 minutes |
| Propagation time increment | PTI = 1 minute |
| Number of points per orbit | NPO = 100 points |
| Average number passes over the terrestrial station in one day | ANV = 3 orbits |
| Number of orbits between node crossings (24 hours/100 minutes) | NNC = 14.4 orbits |
| Average number of visibility points per "pass" | AVP = 15 points |

The computation time savings are estimated as:

$$1 - (ANV \cdot AVP)/(NPO \cdot NNC) = 96.9\%. \quad (23)$$

The computation time savings realized are increased for I large (i.e., an orbit approaching a polar orbit) and for near-equatorial terrestrial station locations.

Conventional step-then-check methods calculate location data at every increment of a series of increments comprising the orbit, whether or not the satellite is visible to the terrestrial station at each incremental point. The method of the instant invention determines when the satellite is visible to the terrestrial station and calculates satellite location data only within the visibility time interval.

Thus, an improved communication method and apparatus has been described which overcomes specific problems and accomplishes certain advantages relative to prior art methods and mechanisms. The improvements over known technology are significant. The expense, complexities and computational intensity of previous methods are avoided. Similarly, visibility intervals are more readily and rapidly calculated.

The foregoing description of the specific embodiments will so fully reveal the general nature of the invention that others can, by applying current knowledge, readily modify and/or adapt for various applications such specific embodiments without departing from the generic concept and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for establishing communications between a satellite and a radio coupled to a terrestrial station, the satellite having an orbit with an associated ground path and the terrestrial station having a coverage perimeter with which the associated ground path must intersect for the communications to be possible, said method performed by interacting controllers and comprising steps of:

(i) determining possible configurations between terrestrial station latitudes, satellite ground path minimum latitudes, and satellite ground path maximum latitudes;

(ii) generating and storing multiple computational methods in a storage medium for computing longitudes of equator crossings of the satellite ground paths for each of the possible configurations;

(iii) selecting one of the multiple computational methods as a selected computational method, wherein the selected computational method corresponds to a configuration for the terrestrial station and the satellite ground path;

(iv) determining with the selected computational method, a first range of longitudes of satellite ground path equator crossings within which the satellite ground path will intersect the coverage perimeter during the satellite orbit;

(v) determining with the selected computational method, a first time when a first equator crossing of the ground path has a longitude falling within the first range of longitudes;

(vi) determining with the selected computational method and the first time, a second time when the satellite ground path will move into the coverage perimeter, and a third time when the satellite ground path will move out of the coverage perimeter; and (vii) activating the radio between the second time and the third time so as to establish the communications between the terrestrial station and the satellite.

2. A method for rapid determination of constellation visibility for radio communication between a terrestrial station and a satellite, said method comprising steps of:

calculating satellite observation parameters relevant to a particular coverage area by a first computer;

selecting a method for computing orbital parameters from a plurality of methods for computing orbital parameters based on the satellite observation parameters calculated in said calculating step;

calculating visibility time intervals using the method selected in said selecting step;

storing the visibility time intervals in a first storage medium; and activating the radio during a time determined from the visibility time intervals to synchronize communications between the terrestrial station and the satellite.

3. A method as claimed in claim 2, wherein the step of selecting the method includes steps of:

setting a visibility case for a particular satellite of the constellation and a particular terrestrial station to one of a first, second, third and fourth visibility case, wherein the first visibility case includes orbits having at least one orbit segment visible on each orbit, the second visibility case includes orbits having at most one orbit segment visible on some orbits, the third visibility case includes orbits having at most two orbit segments visible on some orbits and the fourth visibility case includes orbits having no orbit segments visible on any orbit;

selecting a first method from the plurality of methods when the visibility case is the first visibility case;

selecting a second method from the plurality of methods when the visibility case is the second visibility case;

selecting a third method from the plurality of methods when the visibility case is the third visibility case; and calculating a first range of visible ascension nodes using the first, second or third method when the visibility case is one of the first, second and third visibility cases, respectively.

4. A method as claimed in claim 3, further including a step of calculating a second range of visible ascension nodes when the visibility case is the third visibility case.

5. A method as claimed in claim 3, wherein setting a visibility case includes steps of:

determining when a station latitude is greater than zero;

determining when a station latitude is less than or equal to zero;

determining when a maximum satellite latitude is less than a minimum station latitude;

determining when a minimum satellite latitude is greater than a maximum station latitude; and setting the visibility case to the fourth visibility case when the maximum satellite latitude is less than the minimum station latitude and the station latitude is greater than zero or when the minimum satellite latitude is greater than the maximum station latitude and the station latitude is not greater than zero.

6. A method as claimed in claim 3, wherein setting a visibility case includes steps of:

determining when a station latitude is less than or equal to zero;

determining when a minimum satellite latitude is less than a minimum station latitude;

determining when a sum of magnitudes of a station latitude and an angle alpha is less than $\pi/2$, the angle alpha defined as the angle between a first line extending from a center of a celestial body having the terrestrial station thereon and the terrestrial station and a second line an extending from the center to an edge of a coverage area associated with the terrestrial station, the coverage area comprising a region surrounding the terrestrial station wherein the terrestrial station is capable of radio contact with satellites having ground paths falling therewithin;

setting the visibility case to the third visibility case when the station latitude is not greater than zero, the minimum satellite latitude is not greater than the maximum station latitude, the minimum satellite latitude is less than the minimum station latitude and the sum is less than $\pi/2$; and setting the visibility case to the first visibility case when the station latitude is less than zero, the minimum satellite latitude is not greater than the maximum station latitude, the minimum satellite latitude is less than the minimum station latitude and the sum is not less than $\pi/2$.

7. A method as claimed in claim 3, wherein setting a visibility case includes steps of:

determining when a station latitude is greater than zero;

determining when a maximum satellite latitude is greater than a maximum station latitude;

determining when a sum of a station latitude and angle alpha is less than $\pi/2$, the angle alpha defined as the angle between a first line extending from a center of the celestial body having the terrestrial station thereon and the terrestrial station and a second line an extending from the center to an edge of a coverage area associated with the terrestrial station, the coverage area comprising a region surrounding the terrestrial station wherein the terrestrial station is capable of radio contact with satellites having ground paths falling therewithin;

setting the visibility case to the third visibility case when the station latitude is greater than zero, the maximum satellite latitude is less than the minimum station latitude, the maximum satellite latitude is greater than the maximum station latitude and the sum is less than $\pi/2$; and setting the visibility case to the first visibility case when the station latitude is greater than zero, the maximum satellite latitude is less than the minimum station latitude, the maximum satellite latitude is greater than the maximum station latitude and the sum is not less than $\pi/2$.

8. A method as claimed in claim 3, wherein setting a visibility case includes steps of:

determining when a station latitude is greater than zero;

determining when a maximum satellite latitude is not less than a minimum station latitude;

determining when the maximum satellite latitude is not greater than a maximum station latitude;

determining when a minimum satellite latitude is greater than the minimum station latitude; and setting the visibility case to the first visibility case when the maximum satellite latitude is not less than the minimum station latitude, the maximum satellite latitude is not greater than the maximum station latitude, the minimum satellite latitude is greater than the minimum station latitude and the station latitude is greater than zero.

9. A method as claimed in claim 3, wherein setting a visibility case includes steps of:

determining when a station latitude is greater than zero;

determining when a maximum satellite latitude is not less than a minimum station latitude;

determining when the maximum satellite latitude is not greater than a maximum station latitude;

determining when a minimum satellite latitude is not greater than a minimum station latitude; and setting the visibility case to the second visibility case when the maximum satellite latitude is not less than the minimum station latitude, the maximum satellite latitude is not greater than the maximum station latitude, the minimum satellite latitude is not greater than the minimum station latitude and the station latitude is greater than zero.

10. A method as claimed in claim 3, wherein setting a visibility case includes steps of:

determining when a station latitude is not greater than zero;

determining when a minimum satellite latitude is not greater than a maximum station latitude;

determining when the minimum satellite latitude is not less than a minimum station latitude; and setting the visibility case to the first visibility case when the minimum satellite latitude is not greater than the maximum station latitude, the minimum satellite latitude is not less than the minimum station latitude and the station latitude is not greater than zero.

11. A method as claimed in claim 3, wherein setting a visibility case includes steps of:

determining when a station latitude is not greater than zero;

determining when a minimum satellite latitude is not greater than a maximum station latitude;

determining when the minimum satellite latitude is less than a minimum station latitude; and setting the visibility case to the first visibility case when the minimum satellite latitude is not greater than the maximum station latitude, the minimum satellite latitude is less than the minimum station latitude and the station latitude is not greater than zero.

12. A method as claimed in claim 2, further comprising a step of transmitting a message from a terrestrial station to a satellite during at least one of the visibility time intervals calculated by the first computer.

13. A method as claimed in claim 12, wherein transmitting the message includes a step of transmitting a message including visibility time intervals calculated by the first computer.

14. A method as claimed in claim 2, further comprising a step of pointing an antenna located at the terrestrial station to track the satellite during at least one of the visibility time intervals calculated by the first computer.

15. A method as claimed in claim 12, further comprising steps of:

receiving by a receiver located in the satellite, the message transmitted in said transmitting step; and storing the message in a second storage medium by a second computer in the satellite.

16. A method as claimed in claim 3, wherein said step of calculating a first range of visible ascension nodes using the first, second or third method further includes substeps of:

calculating a first ascension node longitude and a first time collectively corresponding to a first visible orbit segment tangentially intersecting the particular coverage area perimeter at a first eastern point during an polar-directed orbit portion; and calculating a second ascension node longitude and a second time collectively corresponding to a second visible orbit segment tangentially intersecting the particular coverage area perimeter at a first western point during an polar-directed orbit portion; and wherein calculating visibility time intervals includes a step of calculating a first visibility time interval based on the first ascension node longitude, the first time, the second ascension node longitude and the second time.

17. A method as claimed in claim 16, wherein said step of calculating a first range of visible ascension nodes using the first, second or third method further includes a step of calculating a second range of visible ascension nodes using the third method when the visibility case is the third visibility case, wherein calculating a second range of visible ascension nodes includes substeps of:

calculating a third ascension node longitude and a third time collectively corresponding to a third visible orbit segment tangentially intersecting the particular coverage area perimeter at a second eastern point during a equatorially-bound orbit portion; and calculating a fourth ascension node longitude and a fourth time collectively corresponding to a second visible orbit segment tangentially intersecting the particular coverage area perimeter at a second western point during a equatorially-bound orbit portion; and wherein calculating visibility time intervals further includes a step of calculating a second visibility time interval based on the third ascension node longitude, the third time, the fourth ascension node longitude and the fourth time.

18. A method as claimed in claim 16, wherein calculating a first ascension node longitude and a first time includes steps of:

calculating a tangent azimuth corresponding to the first eastern point;

calculating a first uncorrected ascension node longitude corresponding to the first eastern point;

calculating a time for the satellite to travel from the first uncorrected ascension node longitude to the first eastern point;

calculating a node rate equal to an algebraic sum of a rate of rotation of a celestial body having the particular coverage area thereon and a precession rate of the constellation;

calculating a first angle of rotation equal to a product of the node rate and the time for the satellite to travel from the first uncorrected ascension node longitude to the first eastern point; and calculating the first ascension node longitude by adding the first angle of rotation to the first uncorrected ascension node longitude.

19. A method as claimed in claim 18, wherein calculating a tangent azimuth includes steps of:

initially selecting a tangent azimuth estimate;

calculating a first latitude (PtLat1) and a first longitude (PtLong1) of a first test point on the perimeter of a coverage area corresponding to the tangent azimuth estimate;

calculating a first angle U'1, where:

$U'1 = \text{Cos}^{-1}[\cos(u) \cdot \cos(\alpha)]$, where u represents an angular distance along an orbit from an equator to a test point, where:

$u = \text{Sin}^{-1}[\sin(\text{PtLat1})/\sin(I)]$;

where I is an orbital angle of inclination; calculating a second angle U'2, where:

$U'2 = \text{Cos}^{-1}\{\cos(\delta)[\cos(\text{station longitude} - AN)]\}$, where $\delta$ represents a geocentric station latitude and AN represents longitude of an ascension node;

calculating a first difference between the first angle U'1 and the second angle U'2; and updating the tangent azimuth estimate by a first increment when the first difference is greater than a first minimum allowable error.

20. A method as claimed in claim 3, wherein, when the visibility case is one of the first, second and third visibility cases, calculating visibility time intervals includes steps of:

calculating a first visibility time interval for a satellite to travel from a current satellite position to a perimeter of a coverage area of a terrestrial station located on a celestial body; and calculating a next visibility time interval for the satellite to travel from the current satellite position to the perimeter of the coverage area of the terrestrial station.

21. In a system comprising a control station, a terrestrial station and a satellite, the control station including a first computer and a first storage medium coupled to the first computer, the terrestrial station coupled to the control station including a first transmitter and a first receiver each coupled to a first antenna, the satellite including a second computer, a second storage medium coupled to the second computer, a second transmitter and a second receiver each coupled both to the second computer and to a second antenna, a method for determination of satellite visibility for synchronizing communications between the terrestrial station and the satellite, said method comprising steps of:

providing an initial set of data describing terrestrial station constants, satellite parameters, an epoch time indicating absolute time and date, a start time and a stop time to the first computer;

calculating terrestrial station and satellite parameters by the first computer from the initial set of data;

determining a visibility case by the first computer;

determining a first visibility time interval by the first computer;

calculating subsequent visibility time intervals by the first computer;

interfacing the control station with the terrestrial station to control an initiation of communications; and synchronizing communications between the terrestrial station and the satellite based on the first visibility time interval and subsequent visibility time intervals.

22. A method as claimed in claim 21, wherein determining a first visibility time interval includes a step of setting a visibility case to one of a first, second, third and fourth visibility case, wherein the first visibility case includes orbits having at least one orbit segment visible on each orbit, the second visibility case includes orbits having at most one orbit segment visible on some orbits, the third visibility case includes orbits having at most two orbit segments visible on some orbits and the fourth visibility case includes orbits having no orbit segments visible on any orbit.

23. A method as claimed in claim 21, wherein synchronizing communications between the terrestrial station and the satellite includes transmitting a message by the first transmitter.

24. A method as claimed in claim 23, including steps of:

determining a plurality of visibility time intervals by the first computer; and transmitting a message comprising at least one of the plurality of visibility time intervals.

25. An apparatus for determination of satellite visibility for synchronizing communications between a terrestrial station and a satellite, said apparatus comprising:
- a processor;
- a storage medium, said storage medium coupled to said processor, said storage medium for storing data received from said processor and for supplying stored data to said processor:
- a transceiver for transmitting messages and for receiving messages to control said communications between said terrestrial station and said satellite;

said processor, transceiver and storage medium for:
  (i) receiving satellite observation parameters relevant to a particular coverage area;
  (ii) determining a visibility case for said satellite and said terrestrial station by said processor;
  (iii) calculating visibility time intervals for said visibility case by said processor; and
  (iv) initiating communication between said satellite and said terrestrial station during a visibility time interval determined by said processor.

* * * * *